US00RE41922E

(19) United States
(12) Reissued Patent
Gough et al.

(10) Patent Number: US RE41,922 E
(45) Date of Reissued Patent: Nov. 9, 2010

(54) METHOD AND APPARATUS FOR PROVIDING TRANSLUCENT IMAGES ON A COMPUTER DISPLAY

(75) Inventors: Michael L. Gough, Ben Lomond, CA (US); Joseph J. MacDougald, Saint Petersburg, FL (US); Gina D. Venolia, Bellevue, WA (US); Thomas S. Gilley, New York, NY (US); Greg M. Robbins, Issaquah, WA (US); Daniel J. Hansen, Jr., Georgetown, TX (US); Abhay Oswal, Rancho Santa Fe, CA (US)

(73) Assignee: Apple Inc., Cupertino, CA (US)

(21) Appl. No.: 10/163,748

(22) Filed: Jun. 5, 2002

(Under 37 CFR 1.47)

Related U.S. Patent Documents

Reissue of:
(64) Patent No.: 6,072,489
Issued: Jun. 6, 2000
Appl. No.: 08/130,079
Filed: Sep. 30, 1993

U.S. Applications:
(63) Continuation-in-part of application No. 08/060,572, filed on May 10, 1993, now Pat. No. 5,638,501.

(51) Int. Cl.
*G06T 15/00* (2006.01)

(52) U.S. Cl. ..... 715/803; 715/762; 715/781; 345/629

(58) Field of Classification Search ..... 345/418, 345/419, 629; 715/204, 762, 781, 803; 395/133–135, 395/155–158, 160
See application file for complete search history.

(56) References Cited

U.S. PATENT DOCUMENTS 4,555,775 A * 11/1985 Pike ..... 715/790
4,686,522 A 8/1987 Hernandez (Continued)

FOREIGN PATENT DOCUMENTS

EP 0 280 582 * 2/1988
EP 0635780 10/2000
EP 0635779 1/2001

OTHER PUBLICATIONS

IBM Technical Disclosure Bulletin, "Transparent Window Selection", vol. 30, No. 11, Apr. 1988, pp. 268–270.*

(Continued)

*Primary Examiner*—Phu K Nguyen
(74) *Attorney, Agent, or Firm*—Wong, Cabello, Lutsch, Rutherford & Brucculeri LLP

(57) ABSTRACT

A method and apparatus is described for producing a translucent image over a base image created on the display screen of a computer system by a selected first application program, and conducting image operations either on the base image created by the selected application program with reference to the translucent image produced, or conducting image operations on the translucent image with reference to the base image of the first application program. The first application program runs on a central processing unit (CPU) of a computer system to produce a base image, and another application program referred to as the overlay program is run to produce the translucent image such that portions of the base image which are overlapped by the overlay image are at least partially visible through the translucent image. There is also a mechanism for blending the first video data and the second video data to produce a blended image on the screen assembly.

7 Claims, 34 Drawing Sheets

U.S. PATENT DOCUMENTS

| | | | | | |
|---|---|---|---|---|---|
| 4,783,648 | A | * | 11/1988 | Homma et al. | 715/794 |
| 4,823,281 | A | | 4/1989 | Gough | |
| 4,827,253 | A | | 5/1989 | Maltz | |
| 4,868,765 | A | | 9/1989 | Diefendorff | |
| 4,914,607 | A | * | 4/1990 | Takanashi et al. | 715/790 |
| 4,954,970 | A | | 9/1990 | Walker | |
| 4,959,803 | A | * | 9/1990 | Kiyohara et al. | 715/791 |
| 4,974,196 | A | * | 11/1990 | Iwami et al. | 715/804 |
| 4,992,781 | A | | 2/1991 | Iwasaki | |
| 5,119,476 | A | * | 6/1992 | Texier | 715/809 |
| 5,124,691 | A | * | 6/1992 | Sakamoto et al. | 715/799 |
| 5,185,808 | A | | 2/1993 | Cok | |
| 5,265,202 | A | | 11/1993 | Krueger | |
| 5,283,560 | A | * | 2/1994 | Bartlett | 715/729 |
| 5,283,867 | A | | 2/1994 | Ayley | |
| 5,307,452 | A | | 4/1994 | Hahn | |
| 5,313,227 | A | | 5/1994 | Aoki | |
| 5,313,571 | A | | 5/1994 | Hirose | |
| 5,351,067 | A | * | 9/1994 | Lumelsky et al. | 345/561 |
| 5,425,137 | A | | 6/1995 | Mohan | |
| 5,425,141 | A | | 6/1995 | Gedye | |
| 5,463,726 | A | | 10/1995 | Price | |
| 5,463,728 | A | * | 10/1995 | Blahut et al. | 345/807 |
| 5,467,441 | A | | 11/1995 | Stone | |
| 5,467,443 | A | | 11/1995 | Johnson | |
| 5,469,540 | A | | 11/1995 | Powers | |
| 5,469,541 | A | | 11/1995 | Kingman | |
| 5,475,812 | A | | 12/1995 | Corona | |
| 5,581,670 | A | | 12/1996 | Bier | |
| 5,590,265 | A | | 12/1996 | Nakazawa | |
| 5,596,690 | A | | 1/1997 | Stone | |
| 5,617,114 | A | | 4/1997 | Bier | |
| 5,638,501 | A | * | 6/1997 | Gough et al. | 345/639 |
| 5,651,107 | A | * | 7/1997 | Frank et al. | 345/768 |
| 5,652,851 | A | | 7/1997 | Stone | |
| 5,729,704 | A | | 3/1998 | Stone | |
| 5,798,752 | A | | 8/1998 | Buxton | |
| 5,818,455 | A | | 10/1998 | Stone | |
| 5,831,615 | A | * | 11/1998 | Drews et al. | 345/768 |
| 5,949,432 | A | | 9/1999 | Gough | |

OTHER PUBLICATIONS

Anonymous, Method to Allow Uers to Select Transparent Color for Windows, Mar. 1993, Research Disclosure, pp. 1–3.

Bier et al., "Toolglass and Magic Lenses: The See–Through Interface," 1993, Computer Graphics Proceedings, Annual Conference Series, pp. 73–80.

Foley, J.D., Van Dam, A., Feiner, S.K., Hughes, J.F., Computer Graphics: Principles and Practice, 1990, pp. 754–758, 909–910, Second Edition, Addison–Wesley Publishing Company, Reading, Massachusetts.

Hearn, Donald and Baker, M. Pauline, Computer Graphics, 1994, pp. 508–511, Second Edition, Prentice Hall, Inc., Englewood Cliffs, New Jersey.

Vince, John, Computer Animation, 1992, pp. 134, 314, Addison–Wesley Publishing Company, Reading, Massachusetts.

Angel, Edward, Interactive Computer Graphics: A Top–Down Approach with OpenGL, 1997, pp. 57–58, 214–215, 412–414, Addison–Wesley Longman, Inc., Reading, Massachusetts.

Glassner, Andrew S., Editor, Graphics Gems, 1990, pp. 397–399, Academic Press, Inc., San Diego, California.

Hiroshi Ishii and Kazuho Arita, "ClearFace: Translucent Multiuser Interface for TeamWorkStation," in ACM Sigchi Bulletin, Oct. 1991, pp. 67–68, vol. 23, No. 4, ACM, New York, New York.

Douglas C. Engelbart and William K. English, "A Research Center for Augmenting Human Intellect," AFIPS Conference Proceedings of the 1968 Fall Joint Computer Conference, Dec. 1968, pp. 395–410, vol. 33, San Francisco, California. Reprinted by Thompson Book Company, Washington D.C.

Hiroshi Ishii and Kazuho Arita, "ClearFace: Translucent Multiuser Interface for TeamWorkStation," Proceedings of ECSCW–91, Sep. 1991, pp. 163–174, Amsterdam, The Netherlands, Editors L. Bannon, M. Robinson and K. Schmidt.

* cited by examiner

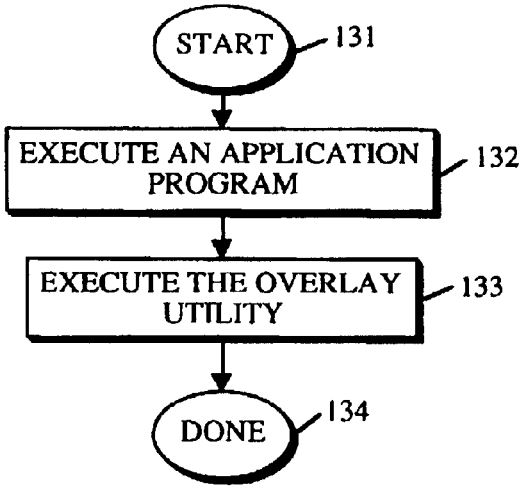
Figure 6a
Figure 6b
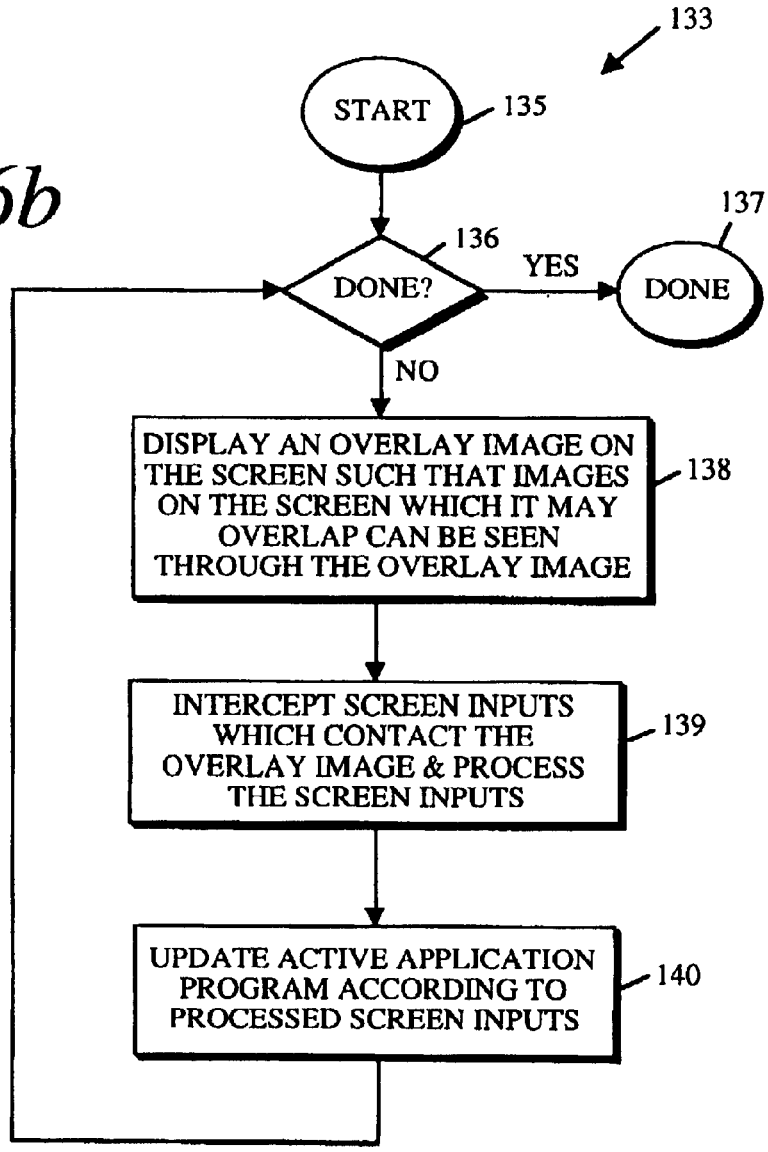

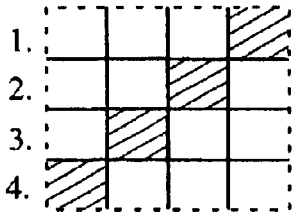
Figure 8a
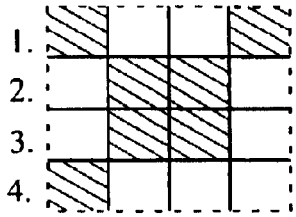
Figure 8b
Figure 8c
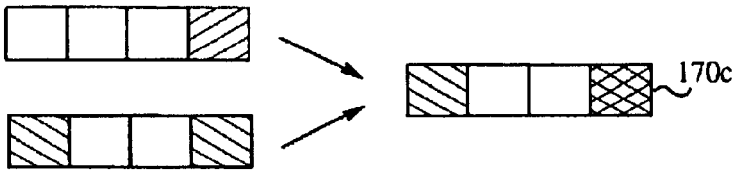
Figure 8d
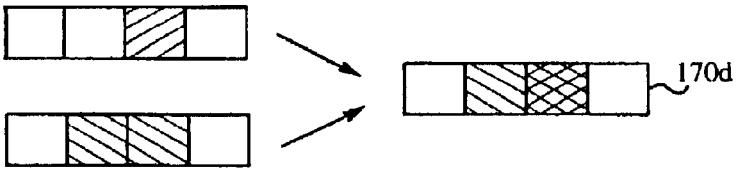
Figure 8e
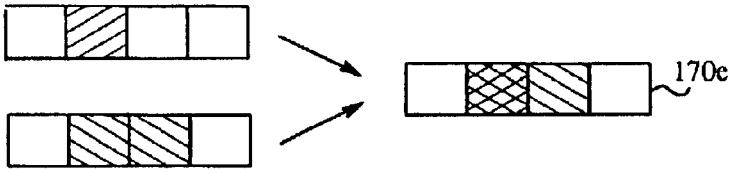
Figure 8f
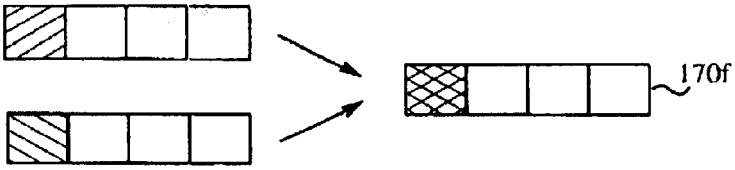

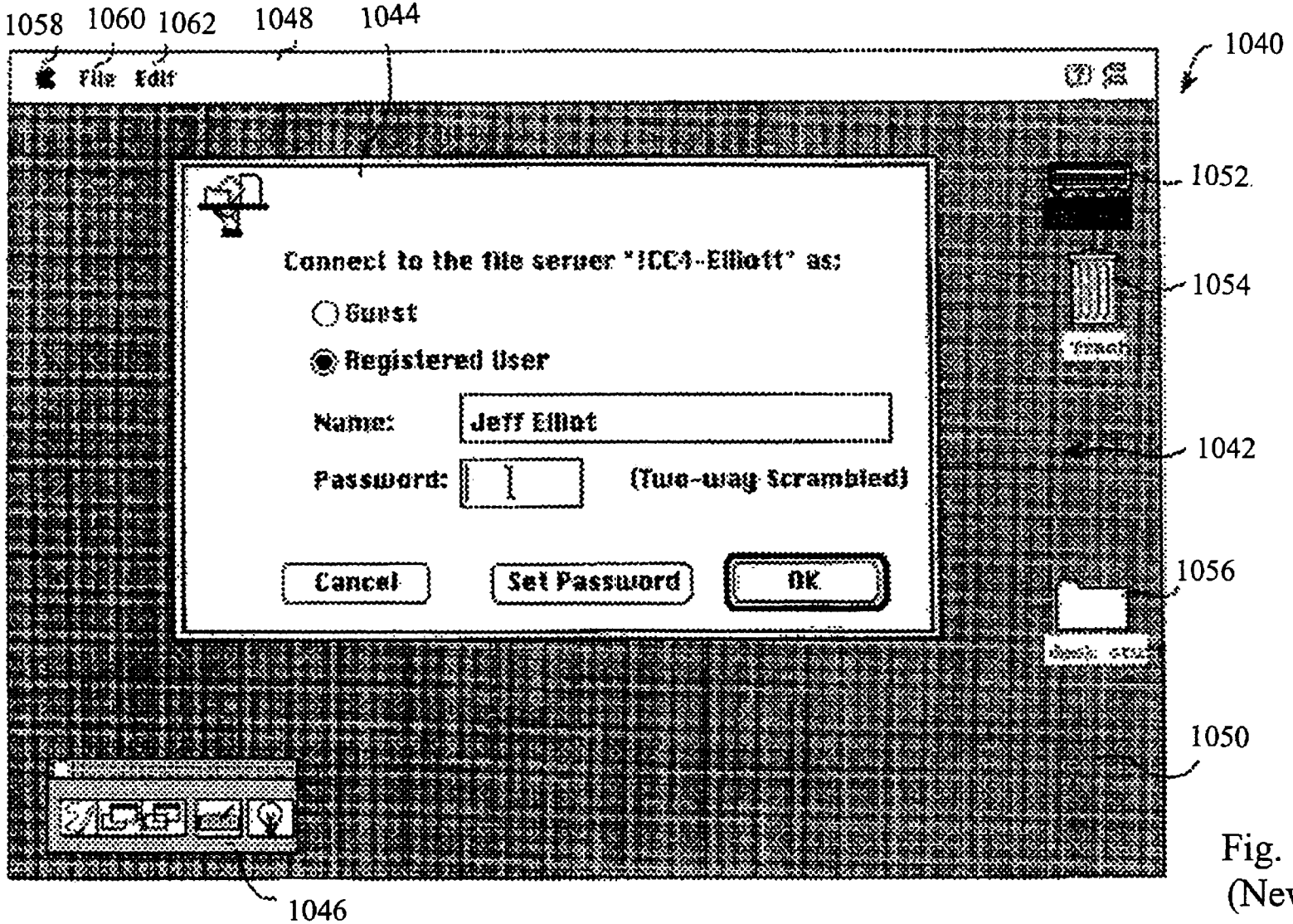
Fig. 18
(New)

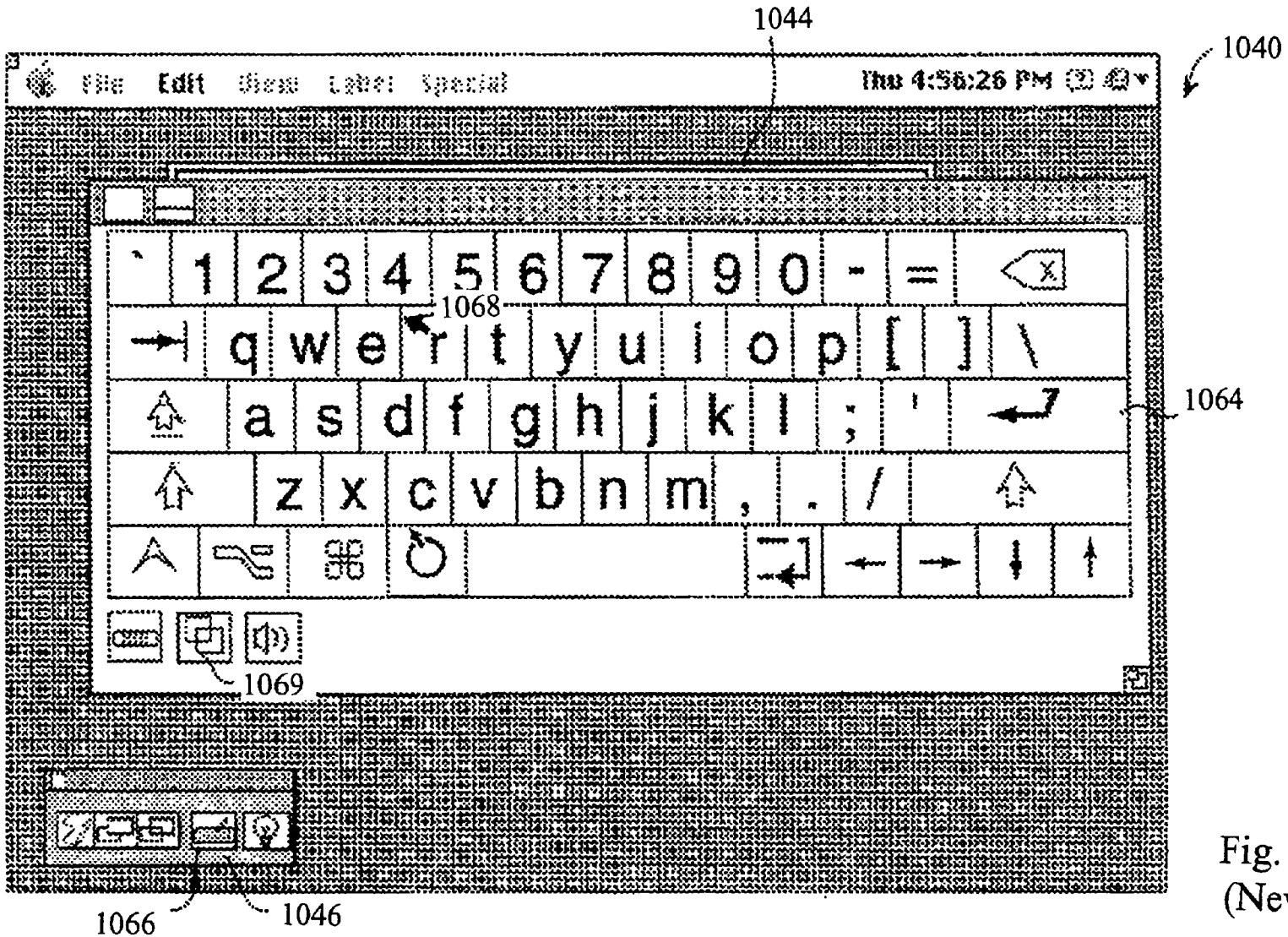
Fig. 19
(New)

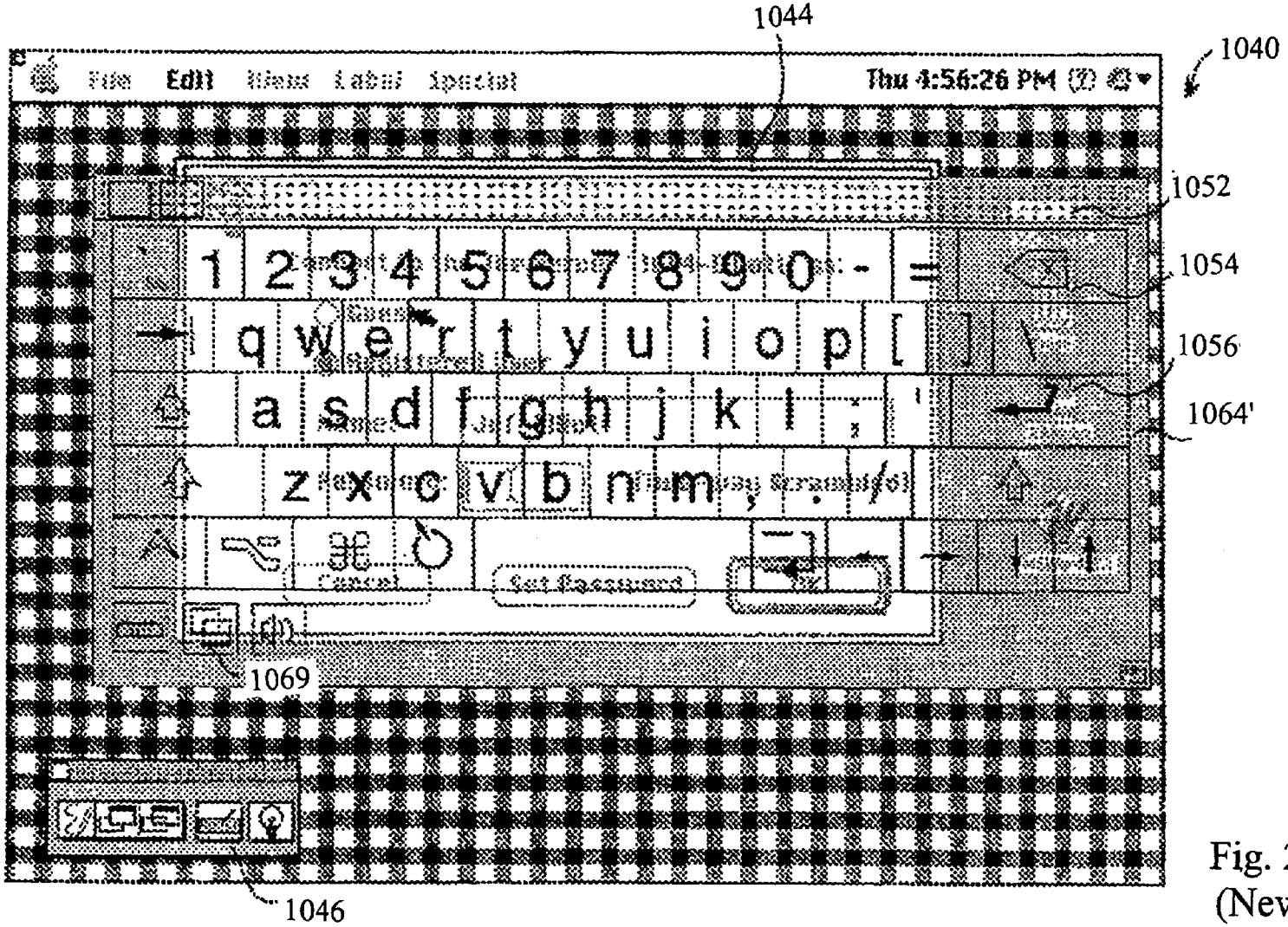
Fig. 20
(New)

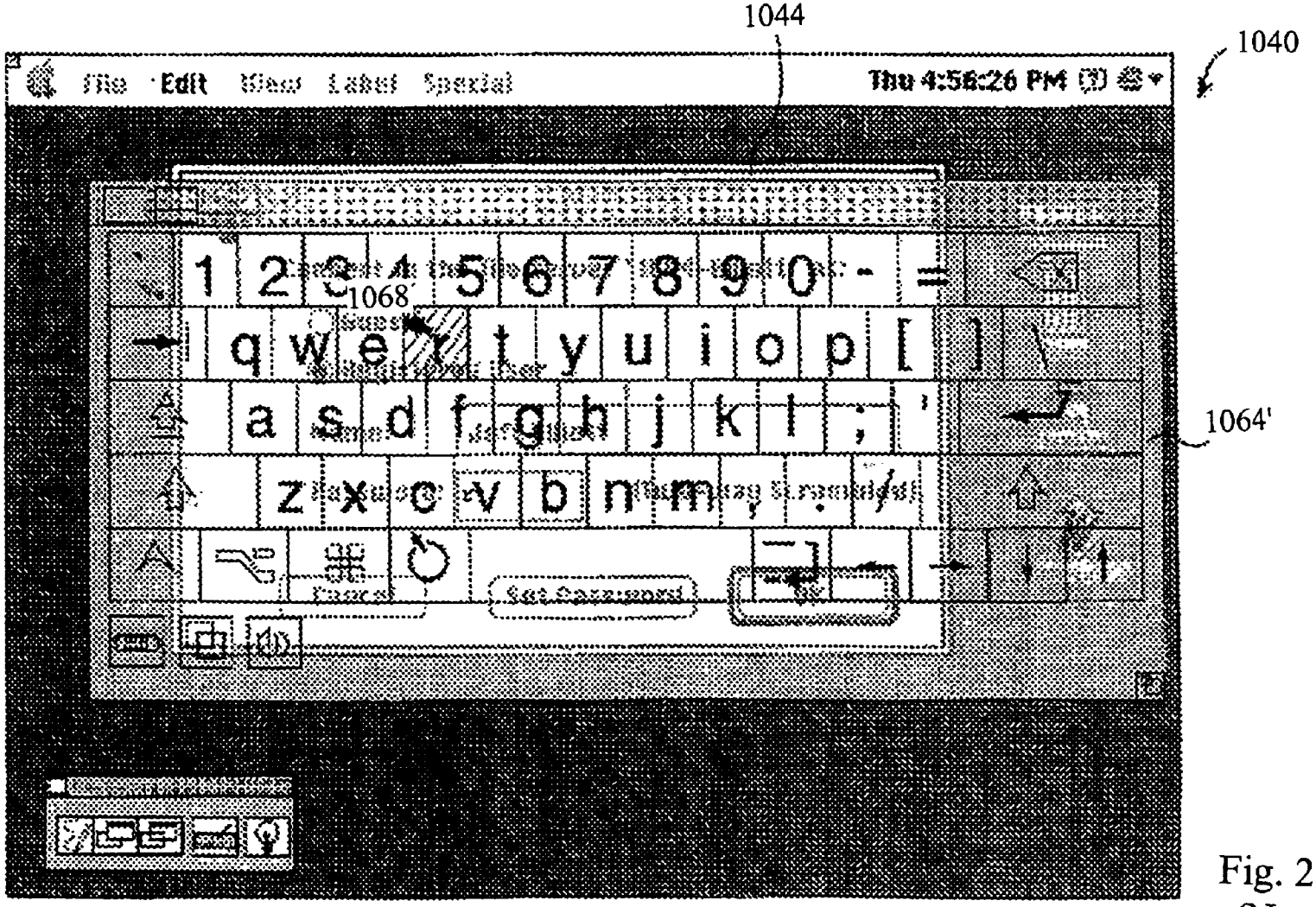
Fig. 21a
(New)

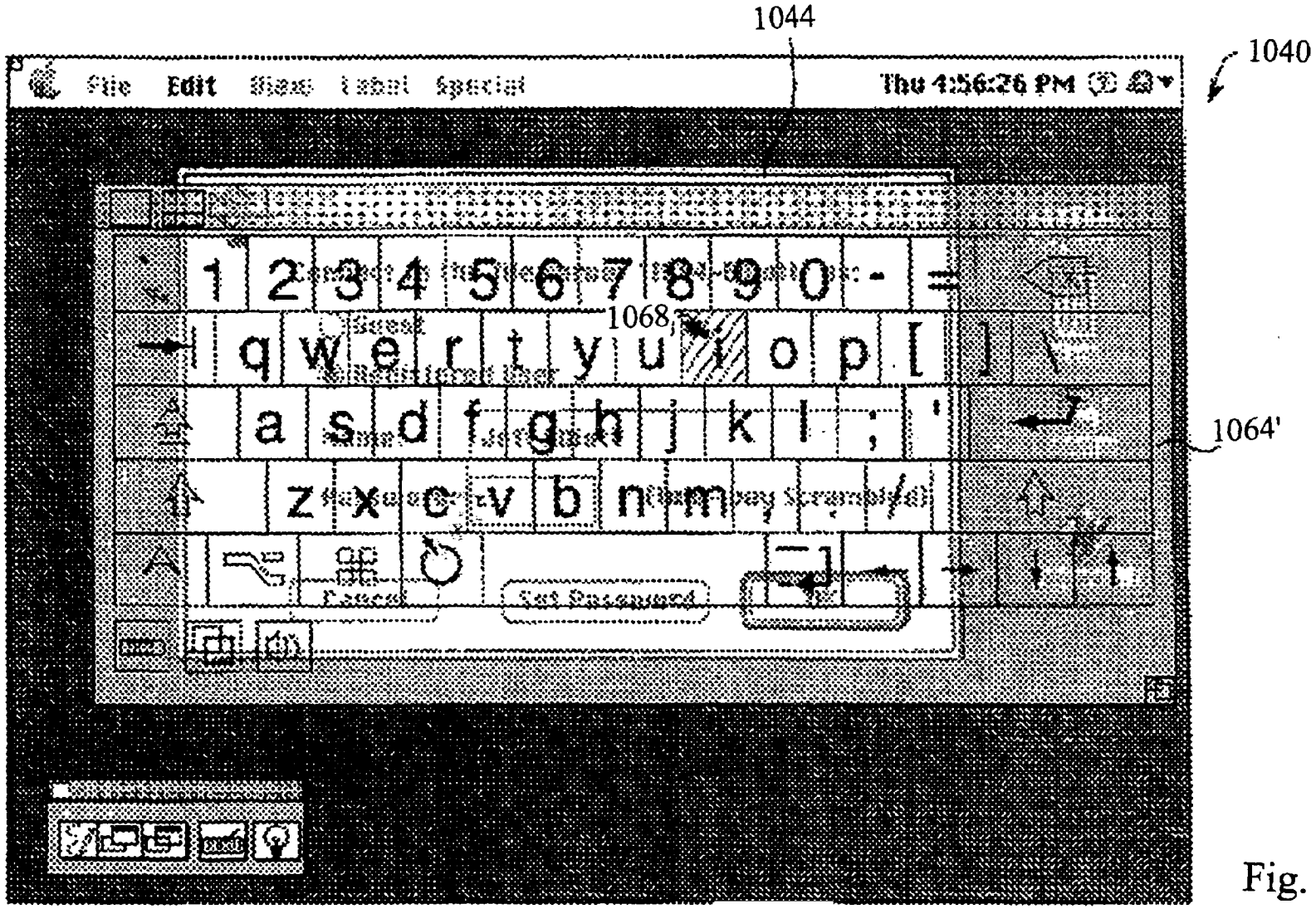
Fig. 21b
(New)

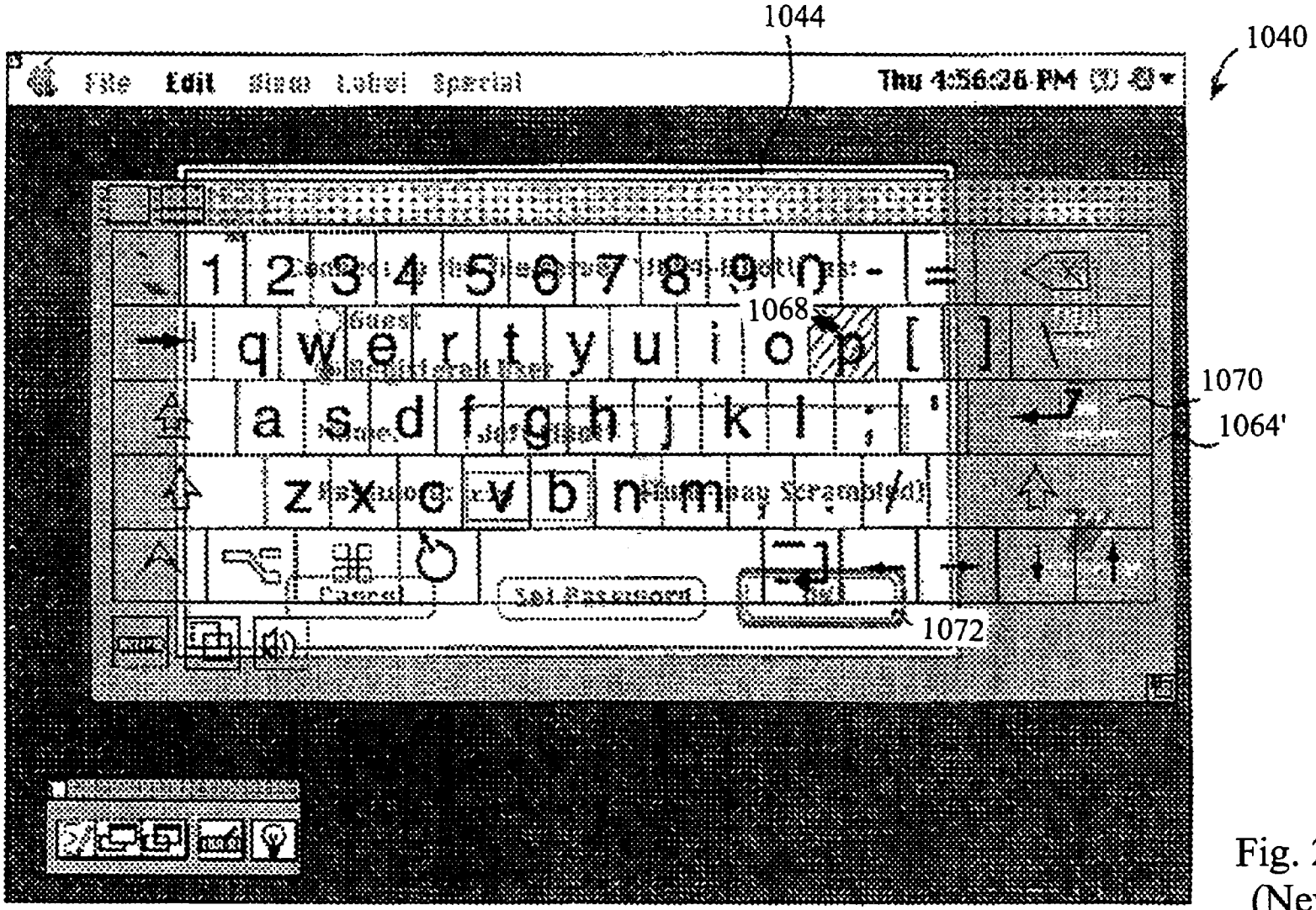
Fig. 21c
(New)

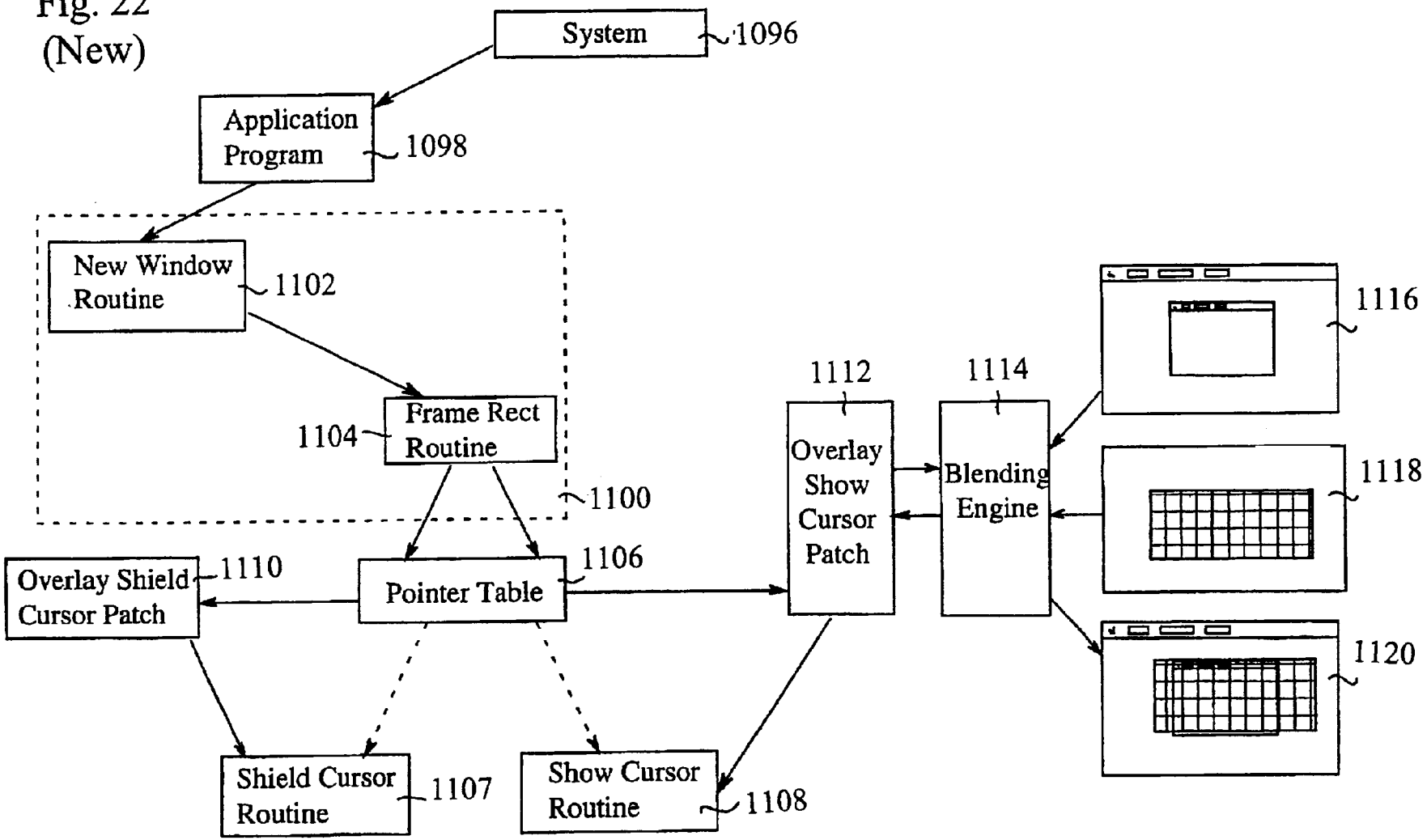
Fig. 22 (New)

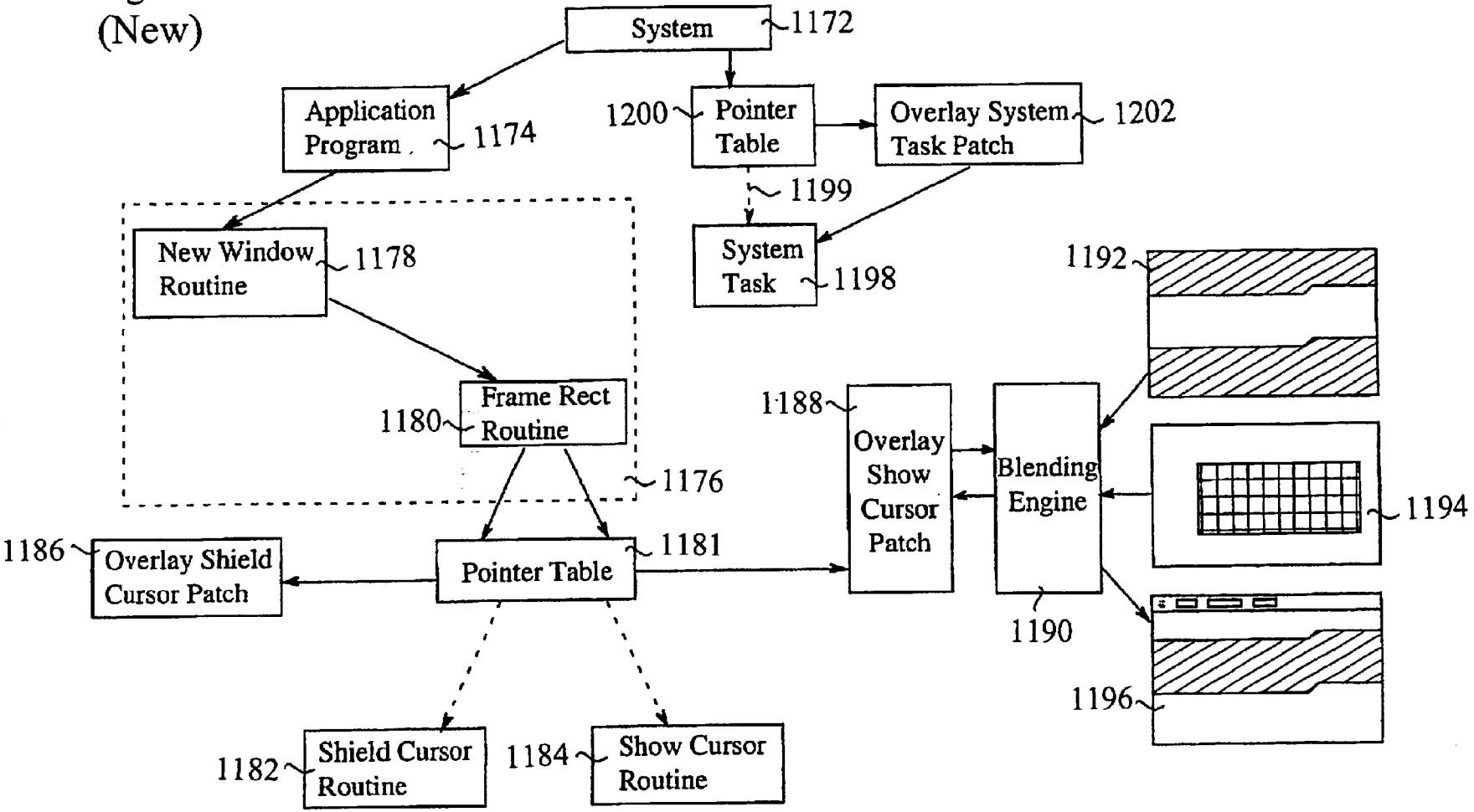
Fig. 23
(New)

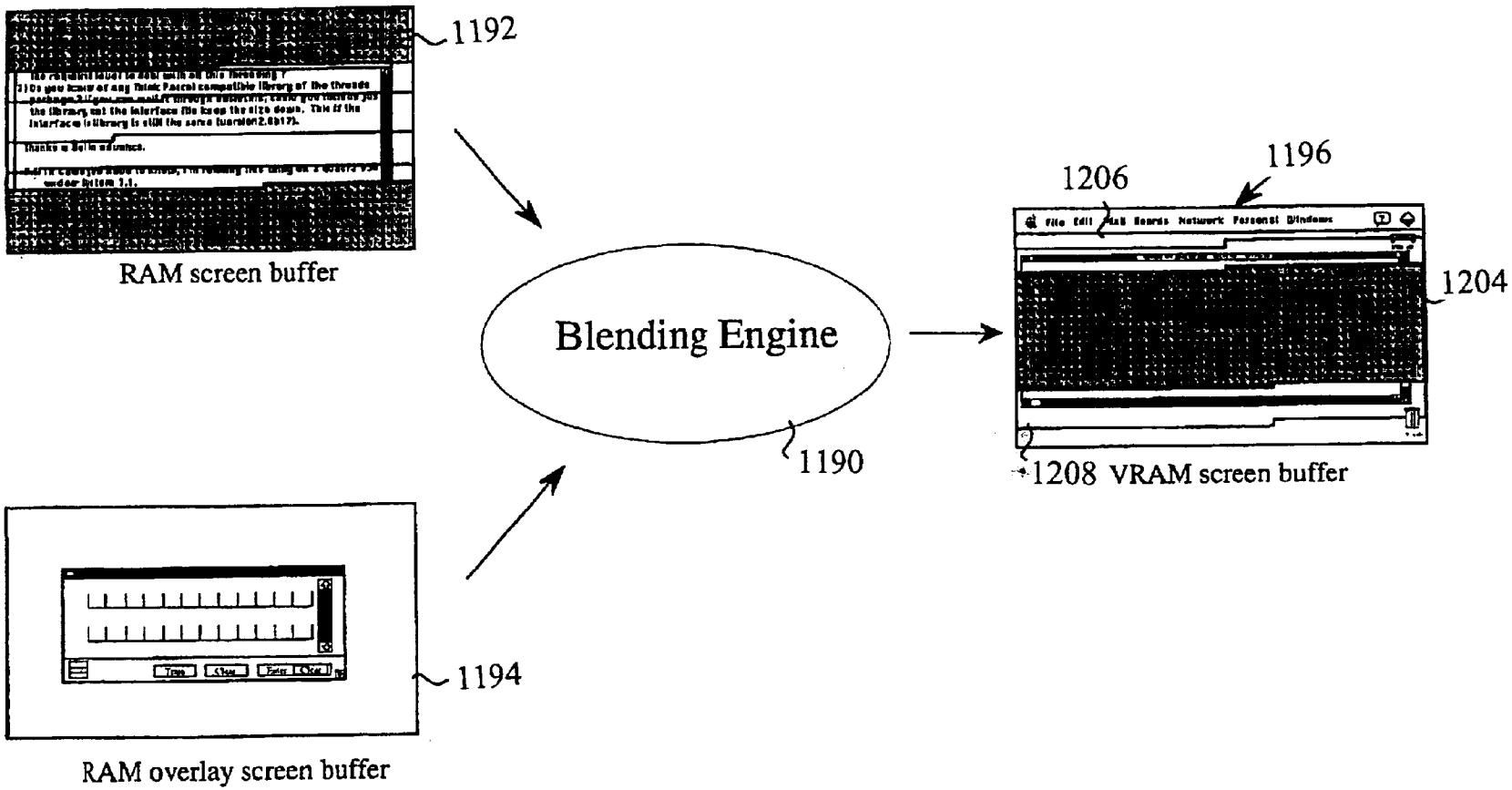
Fig. 24
(New)

(New)
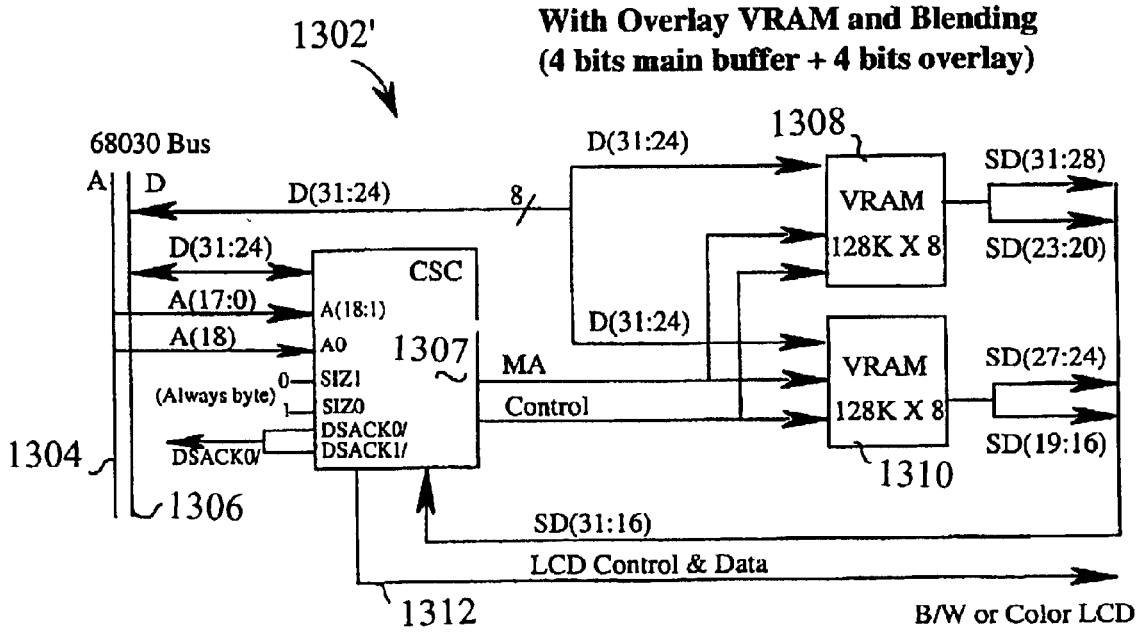
Fig. 26
(New)

METHOD AND APPARATUS FOR PROVIDING TRANSLUCENT IMAGES ON A COMPUTER DISPLAY

Matter enclosed in heavy brackets [ ] appears in the original patent but forms no part of this reissue specification; matter printed in italics indicates the additions made by reissue.

CROSS-REFERENCE TO [A RELATED APPLICATION] *RELATED APPLICATIONS*

This application *is a broadening reissue of U.S. Pat. No. 6,072,489, issued on Jun. 6, 2000. U.S. Pat. No. 6,072,489* is a continuation-in-part of patent application Ser. No. 08/060,572, filed May 10, 1993 under the title "Method and Apparatus for Displaying an Overlay Image," now U.S. Pat. No. 5,638,501 on behalf of Gough et al. and assigned to the same assignee as herein, the disclosure of which is hereby incorporated herein by reference in its entirety. Priority rights *and claims of benefit* based upon this earlier-filed patent application are claimed. *More than one reissue application has been filed for the reissue of U.S. Pat. No. 6,072,489. The reissue applications are application Ser. Nos. 10/163,748 (the present application), and 12/437,500 a continuation reissue of U.S. Pat. No. 6,072,489.*

BACKGROUND OF THE INVENTION

This invention relates generally to computer systems, and more particularly to computer systems utilizing graphical user interfaces.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware computer system, hereinafter generically referred to as a "pen computer system," "pen computer," or the like. A pen-based computer system is typically a small, hand-held computer where the primary method for inputting data includes a "pen" or stylus. A pen-aware computer system is one which has been modified to accept pen inputs in addition to traditional input methods.

A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

Typically, graphical images can be input into the pen computer systems by merely moving the stylus across the surface of the screen, i.e. making a "stroke" on the screen. A stroke can be defined as the engagement of the screen with a stylus, the movement of the stylus across the screen (if any), and its subsequent disengagement from the screen. As the CPU senses the position and movement of the stylus, it can generate a corresponding image on the screen to create the illusion that the stylus is drawing the image directly upon the screen, i.e., that the stylus is "inking" an image on the screen. With suitable recognition software, text and numeric information can also be entered into the pen-based computer system in a similar fashion. Methods for recognizing the meaning of "ink" are well known to those skilled in the art.

Pen computer systems tend to discourage the use of a keyboard as an input device. Most of the software written for pen computers is designed to function well with pen strokes and by "tapping" the stylus against the computer screen in defined areas. A "tap" is a stroke which does not move substantially across the screen. In addition, a primary feature of many pen computer systems is their portability, which a keyboard, if included with the pen system, would seriously degrade.

In some instances, however, the need arises on a pen-based computer for data entry in a keyboard-like fashion. For example, the pen-based computer might be running a non-pen aware program that normally accepts characters from a keyboard. Also, in some cases, the only way to enter data efficiently might be to use a keyboard-like input device.

In particular, a need might arise on a pen computer to enter command or character that is normally or most efficiently executed with keystrokes on a keyboard-based system. In some pen computer systems, such keyboard-like entry of commands can be accomplished using a keyboard image displayed on the screen of the pen computer. The keyboard image resembles a standard keyboard, and keys are selected using a stylus. Most keyboard commands and characters can be entered in this fashion. Another alternative is to provide a recognition window for inputting handwritten data which is then recognized and sent to an application program as if it were typed from a keyboard. A problem with all such input approaches is that they occupy valuable screen space, which is often very limited on pen computer systems.

The efficient use of the available display screen space for observation of images and windows containing images, while particularly pronounced for pen computer systems, is common to all computer systems which display information or images to the user. No matter how large a particular display may be, a particular user will be tempted to attempt to display more information on the screen than can effectively be handled.

Images or information presented on a display screen are typically presented as opaque images, i.e., images "behind" a displayed image are obscured. This is the case with display windows which are layered on a particular screen, with the uppermost window image partially or completely blocking the view of the lower windows. For two windows to be capable of interaction, it is preferable that the user be able to observe both images at the same time, or at close to the same time.

SUMMARY OF THE INVENTION

The present invention provides for the selective creation, establishment, and processing of opaque and translucent images and opaque and translucent windows independently or in connection with other translucent images or a base opaque image provided on a display screen of a computer system. The provision of the translucent image of the present invention makes it possible to optimize space usage of the computer screen itself. Further, the invention also advantageously allows a translucent image to be formed proximate to and with specific reference to particular elements of opaque application images beneath it.

The invention further includes a method for providing a translucent image on the screen of a computer system including the steps of: 1) displaying a translucent image on the screen such that at least one opaque image can be seen through the translucent image, and 2) conducting operations with respect to either the translucent image or upon opaque images on the screen of the computer system. Both translucent and opaque image fields can be employed, which can each be completely blank without any features or elements. Particular operations upon images are considered to be image operations in regions or domains which are defined to be either translucent or opaque regions. Further, the translucent image involved may be a so-called "overlay" image produced by a computer implemented process of the present invention referred to herein as the "overlay utility."

*The present invention additionally provides a transparent overlay image over a base image provided on a screen of a pen computer system. The overlay image can serve as an input device for application programs without obscuring images made on the screen by the application programs. The provision of the transparent overlay image of the present invention makes it possible to use much or all of the screen of the pen computer system for input. It also advantageously allows controls in the overlay image to be formed proximate to specific elements of application images beneath it.*

*A method for providing an overlay image on the screen of a computer system in accordance with the present invention includes the steps of: 1) Displaying a base image on the screen of the computer system; and 2) displaying an overlay image on the screen such that overlapped portions of the application image can be seen through the overlay image. Preferably, the base image is produced by an unmodified application program running on the computer system, and the overlay image is produced by a computer implemented process of the present invention referred to herein as the "overlay utility".*

A method for displaying images on a screen of a selected computer system in accordance with the present invention includes the steps of: 1) running an application program on a central processing unit (CPU) of a computer system to produce a base opaque image on a screen coupled to the CPU; and 2) running an overlay program on the CPU to produce a translucent image on the screen such that portions of an opaque base image which are overlapped by the overlay image are at least partially visible through the overlay image. Preferably, the step of running the overlay program includes the steps of: 1) displaying a translucent image on the screen; 2) intercepting screen inputs which contact the overlay image; 3) processing the intercepted screen inputs in the CPU; and 4 updating the application program based upon the process screen inputs. The step of displaying a translucent image preferably involves the blending of a translucent image with the base image. In one embodiment of the present invention, the blending is accomplished within the CPU, and in another embodiment of the present invention, the blending is accomplished externally to the CPU in specialized video driver circuitry.

A computer system in accordance with the present invention includes a central processing unit (CPU), a screen assembly coupled to the CPU, a mechanism coupled to the screen assembly for displaying a base image on the screen assembly, and a mechanism coupled to the screen assembly for displaying a translucent image on the screen assembly such that portions of the base image which are overlapped by the overlay image are at least partially visible through the overlay image. Preferably, the screen assembly includes an LCD matrix display provided with input from a stylus, a pen, a trackball, a mouse, or a keyboard, as the case may be.

In the computer system of the present invention, the mechanism for displaying the opaque base image preferably includes a first computer implemented process running on the CPU to produce first video data, and video driver circuitry coupled between the CPU and the screen assembly, which is receptive to the first video data. Also preferably, the mechanism for displaying the translucent image includes a second computer implemented process running on the CPU producing second video data, wherein the video driver circuitry is also receptive to the second video data. The computer system blends the first video data and the second video data to produce a blended image on the screen assembly. In one embodiment of the present invention, the blending is part of the second computer implemented process running on the CPU. In another embodiment of the present invention, the blending is accomplished within the hardware of the video driver circuitry.

The computer system according to the invention includes a central processing unit (CPU), a screen for displaying images, the screen being coupled to said CPU, a display coupled to the screen for displaying a translucent image, and an arrangement for conducting image operations beneath the level of a translucent image produced by the display. The computer system may for example, according to one embodiment, be effective to perform image operation with reference to a translucent image on the screen. The computer system according to the invention may further include a screen coupled to the CPU, a display coupled to the screen for displaying a translucent image on the screen, and an arrangement for conducting image operations with reference to a translucent image or an opaque image on the display. The computer system may further include an arrangement effective for conducting selectable image operations with reference to a translucent image or an opaque image on a display screen.

An advantage of the present invention is that a translucent overlay can be provided which permits a user to input data into an active application program without obscuring the user's view of the program's display window. The overlay image of the present invention is therefore well suited for computer systems having limited display areas, including for example pen computer systems.

Another advantage of the overlay image of the present invention is that it works with both pen-aware and non-pen-aware application programs. Therefore, the overlay image of the present invention can be used with the many thousands of application programs which are not designed to be used in pen computer systems.

These and other advantages of the present invention will become apparent upon reading the following detailed descriptions and studying the various figures of the drawings.

BRIEF DESCRIPTION OF THE DRAWINGS

FIG. 6a is a flow diagram showing the implementation of translucent overlay image operations;

FIG. 6b is a flow diagram illustrating the "Overlay Shield Cursor Patch" step of FIG. 5b;

FIGS. 8a–8f illustrate a computer-implemented blending process;

*FIG. 18 is a view of a Macintosh computer screen showing a desktop, a window produced by an application program called "AppleShare" and a utility program known as "PenBoard";*

*FIG. 19 illustrates a non-transparent overlay which mostly obscures the desktop and window of the AppleShare application program;*

*FIG. 20 illustrates the overlay keyboard after it has been made transparent by the method and apparatus of the present invention;*

*FIGS. 21a–21c illustrate the entry of data to the active window of the AppleShare program;*

*FIG. 22 is a diagram illustrating the "Display an Overlay Image" step 138 of FIG. 6B;*

*FIG. 23 illustrates an alternate embodiment of the "Display an Overlay Image" step 138 of FIG. 6B;*

*FIG. 24 illustrates the operation of the "Blending Engine" 1190 of FIG. 23;*

*FIG. 26 illustrates video driver circuitry in accordance with the present invention which provides overlay VRAM and blending capabilities.*

DETAILED DESCRIPTION OF THE PREFERRED EMBODIMENTS

Figure 1:
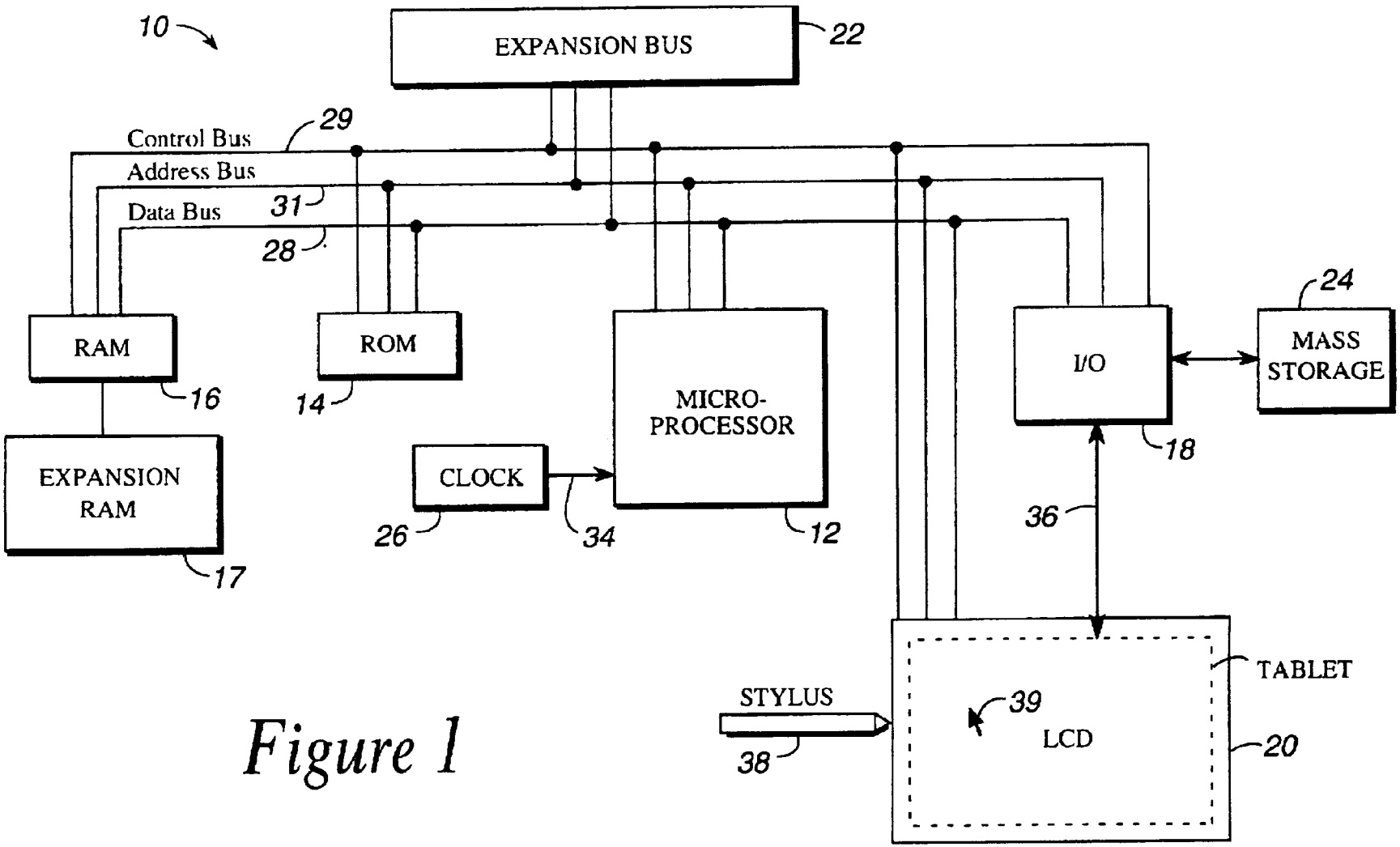
FIG. 1 is a block diagram of a pen computer system in accordance with the present invention.

As shown in FIG. 1, a computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display screen assembly 20 and mass storage 24.

Display assembly 20 of computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 can be a liquid crystal display (LCD) of the type commercially available from a variety of manufacturers. The input device ("tablet") of a preferred display assembly 20 in accordance with the invention can be a thin, clear membrane which covers the LCD display and which is sensitive to the position of a stylus 38 on its surface. Alternatively, the tablet can be an embedded RF digitizer activated by an "active" RF stylus. Combination display assemblies are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer or a cursor 39 on a screen of a general purpose computer. Therefore, as used herein, the terms "pointer," "pointing device," "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 can be provided with a backup battery to prevent the loss of data even when the computer system 10 is turned off. However, it is generally desirable to have some type of long term storage 24 such as a commercially available miniature hard disk drive, nonvolatile memory such as flash memory, battery-backed RAM, PC-data cards, or the like.

In operation, information is input into the computer system 10 by "writing" on the screen of display assembly 20 with stylus 38. Information concerning the location of the stylus 38 on the screen of the display assembly 20 is input into the CPU 12 via I/O circuitry 18. Typically, this information comprises the Cartesian (i.e., x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29 and the address bus 31, similar to the other components in system 10. Expansion bus 22 provides extra ports to couple devices such as modems, display switches microphone, speaker, etc., to the CPU 12.

Figure 2:
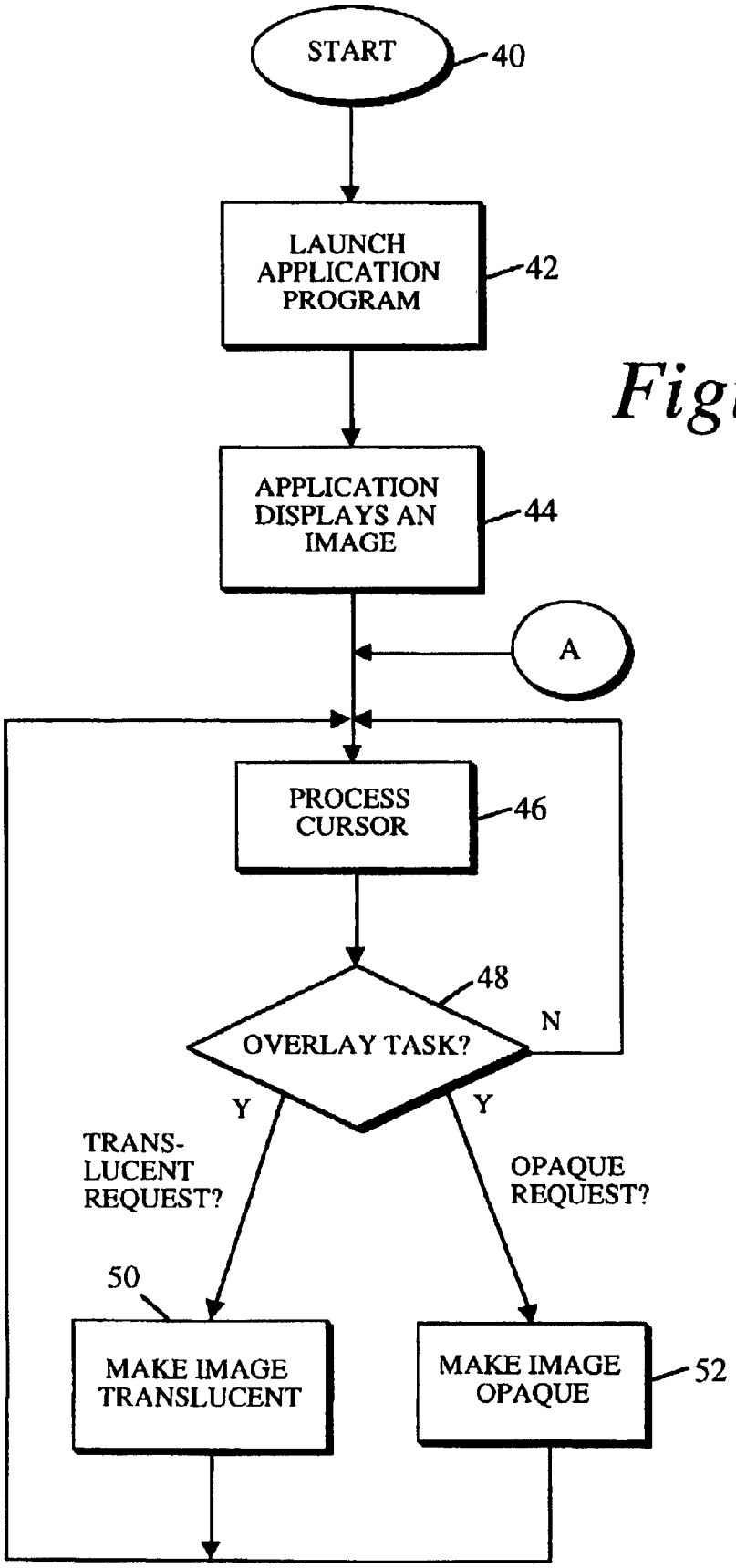
FIG. 2 is flow diagram illustrating the process for launching an application program and the steps of handling opaque and translucent images and cursor operations.

FIG. 2 is flow diagram illustrating the process for launching a selected application program on computer system 10 and the steps of handling opaque and translucent images and cursor operations in accordance with the invention herein. By launching, it is meant to begin execution and perform a range of activities typically considered ancillary to beginning execution, including for example conducting appropriate memory allocation activities. The application program can be any of a number of application programs effective for producing images or windows on display screens 20. Typically, the images or windows produced will be opaque or translucent and full tone, but half-tone and partial tone images are workable with the invention herein as well, irrespective of the particular color or whether a black and white image system is employed. The process of the selected application program begins at start step 40, and the application program launches operation at step 42. According to a preferred version of the invention, the selected application program then displays a desired image on display screen 20, or even the lack of any image, i.e., a blank image, according to step 44. The image launched is preferably opaque, but could be translucent, according to another version of the invention.

Figure 4:
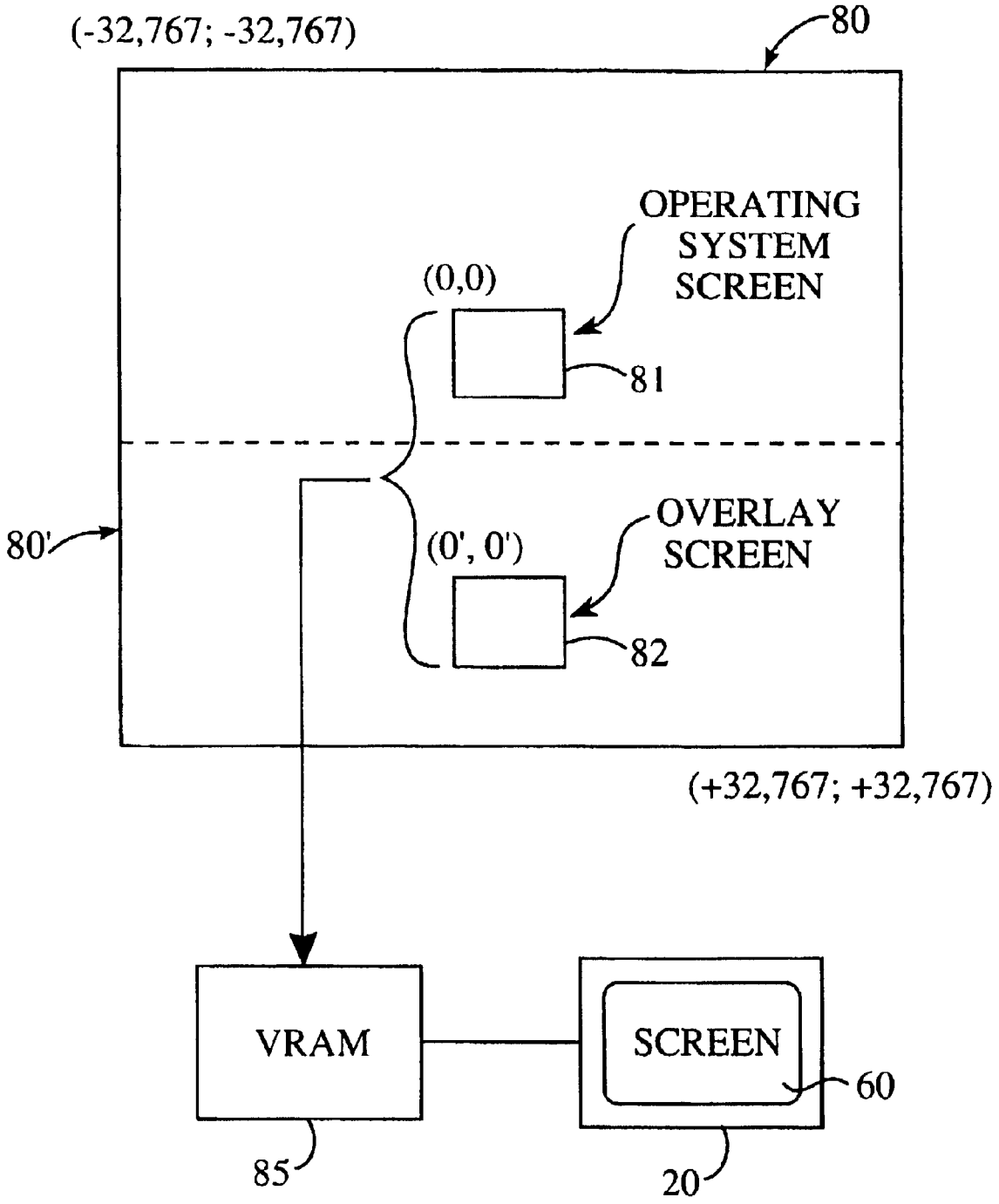
FIG. 4 illustrates the coordinate space on which images are expressed for loading onto a video random access memory (VRAM) for presentation on a display screen.

Next, a "process cursor" operation is undertaken, according to step 46. According to this step, as will be noted in greater detail below, particularly with reference to FIG. 17, it is determined whether the cursor 39 is in a region of a coordinate system of the computer associated with a translucent image domain or whether cursor 39 is operating within a monitor coordinate space. FIG. 4 and the corresponding text discuss the coordinate system in greater detail. It is typically considered true that computer operations are conducted with regard to the particular region in which the cursor is operative. While this is generally true, it is considered to be within the scope of this invention for the cursor to act upon images or windows that are either above or below the actual cursor 39.

Next, according to step 48, it is determined whether or not an overlay task is requested. If not, process control returns to point A preceding the process cursor step 46, and system operation cycles though the process cursor step 46 and decision step 48 repeatedly until an overlay task is requested in step 48.

Two overlay tasks in accordance with the present invention include "translucent request" and an "opaque request." If there is a translucent request then step 50 undertakes the operation of rendering a desired image translucent Similarly, if there is an opaque request, then step 52 is undertaken to render a desired image opaque. After completing either step 50 or 52, control returns to point A with a subsequent process cursor operation being conducted according to step 46. The essential functions of the process cursor operation are as expressed with reference to FIG. 17 below. In particular, as will be seen, these include making a determination as to whether to enter the reactive mode. If the reactive mode is in fact indicated, a determination is made as to whether the cursor 39 is within the bounds of an overlay or translucent image. If the cursor is within the bounds of an overlay image or a translucent image, the cursor 39 is set to be on the overlay or translucent image. If the cursor is not within the bounds of a translucent image, the cursor 39 is set to be on the system monitor. Once the correct situs of the cursor 39 has been established, the process is considered to be complete.

Figure 3A:
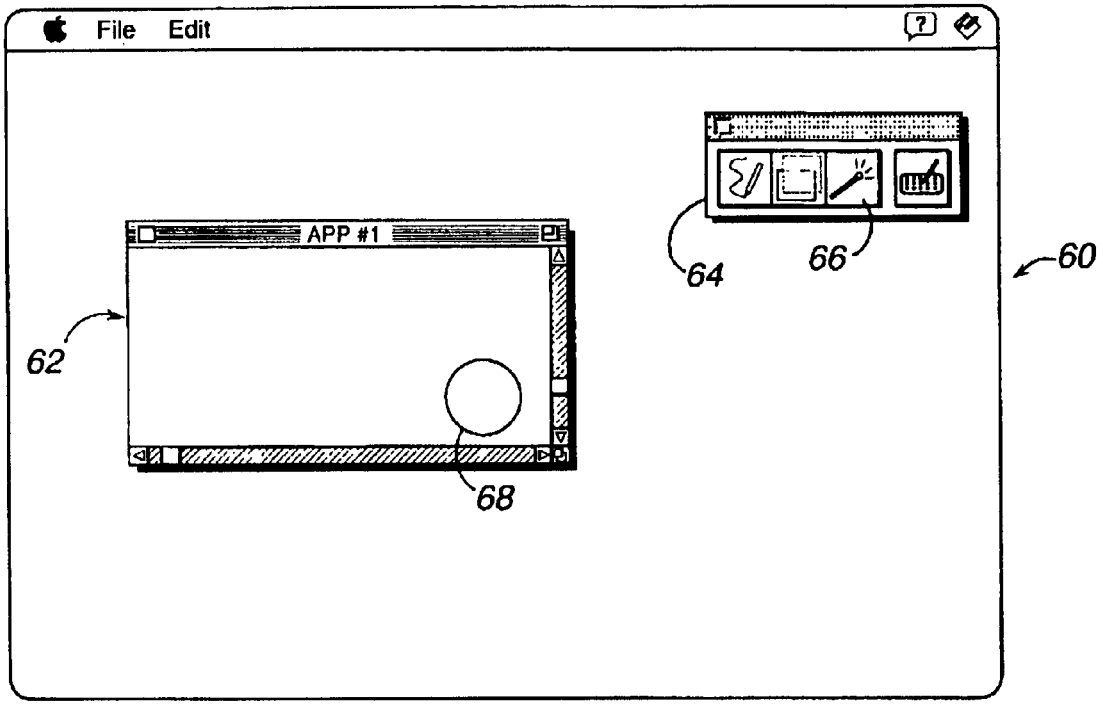
FIG. 3a illustrates an Apple Computer display screen with a single non-translucent overlay window shown on one portion of the screen, and a gadget bar including a wand icon for transforming the overlay window been opaque and translucent states.

To indicate the implementation of the invention in greater detail, FIG. 3a illustrates an Apple Computer Macintosh display screen 60 with a single non-translucent window 62 shown on one portion of screen 60, and a gadget bar 64 including a wand icon 66 for transforming selected image windows between opaque and translucent states. Window 62 encloses an image, in this case a circle 68, for example. This circle 68 is considered to represent an arbitrary image of interest to the user. Window 62 can be considered to be an image produced by a first application or "APP#1"program selected by the user. This image production is described in detail in co-pending patent application Ser. No. 08/060,438, filed May 10, 1993 under the title "Interfacing with a Computer System" on behalf of Gough et al. and assigned to the same assignee as herein, the disclosure of which is hereby incorporated herein by reference in its entirety.

Figure 3B:
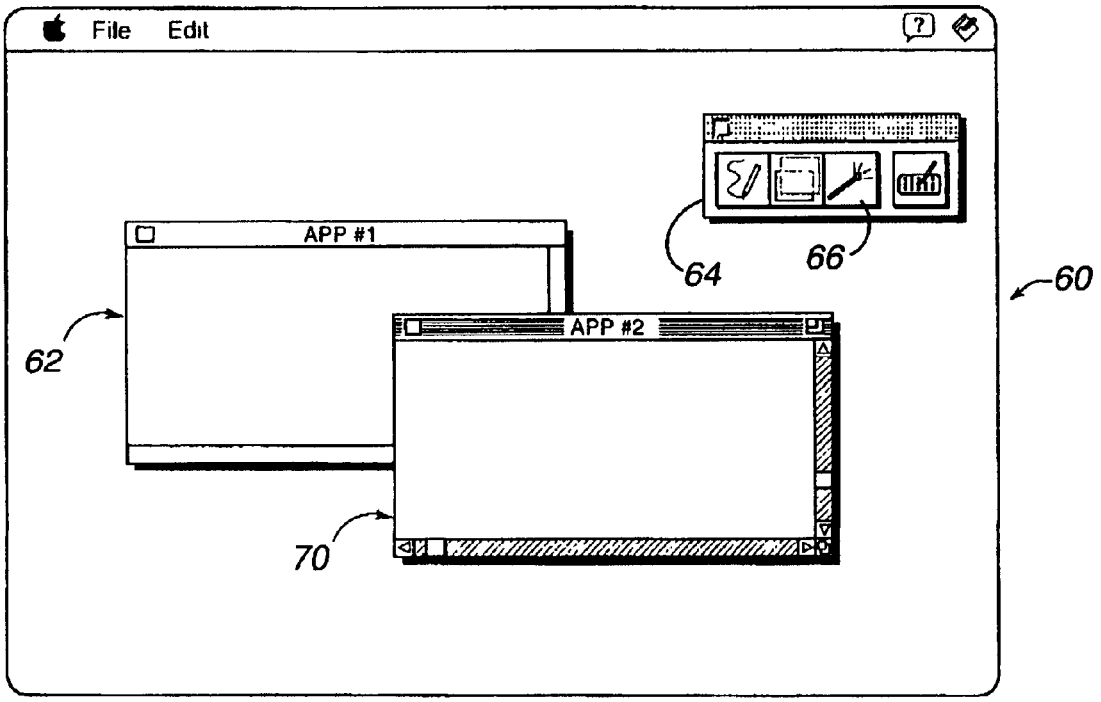
FIG. 3b illustrates an Apple Computer display screen with a pair or overlapping non-translucent windows shown on one portion of the screen, and a gadget bar including a wand icon for transforming the overlay window been opaque and translucent states.

FIG. 3b illustrates an Apple Computer Macintosh display screen 62 with a pair of overlapping non-translucent, i.e., opaque windows, respectively, 62 and 70, shown on one portion of screen 60. Window 60 is produced by a first application program "APP#1," and window 70 is produced by a second application program "APP#2." Gadget bar 64 is shown including wand icon 66 as in FIG. 3a. Wand icon 66 is effective for transforming either of windows 62 or 70 or the images which may reside in the respective windows between opaque and translucent states. The topmost or "active" window 70 is shown superimposing over a portion of lower window 62. Typically, the window selected for translucency is the uppermost or "overlay" window 70, as this permits selected images in the overlapped region of the two windows, to be seen by virtue of the translucency of the uppermost window 70. As it is, prior to window 70 being changed to a translucent state, circle image 68 shown in FIG. 3a is obscured by the overlap between the two windows 62, 70. By clicking on wand icon 66 of FIG. 3b, the user effectively renders the top-most or overlay window 70 partially or completely translucent. By "translucent" it is meant herein that the overlay image or window can be seen, but it can also be seen through. It is understood that this creates the impression that light can travel through the particular image. By translucent, it is further meant that the lines of a-particular image can be seen, but that the spaces between the lines and the spaces around the lines can be seen through.

Figure 3C:
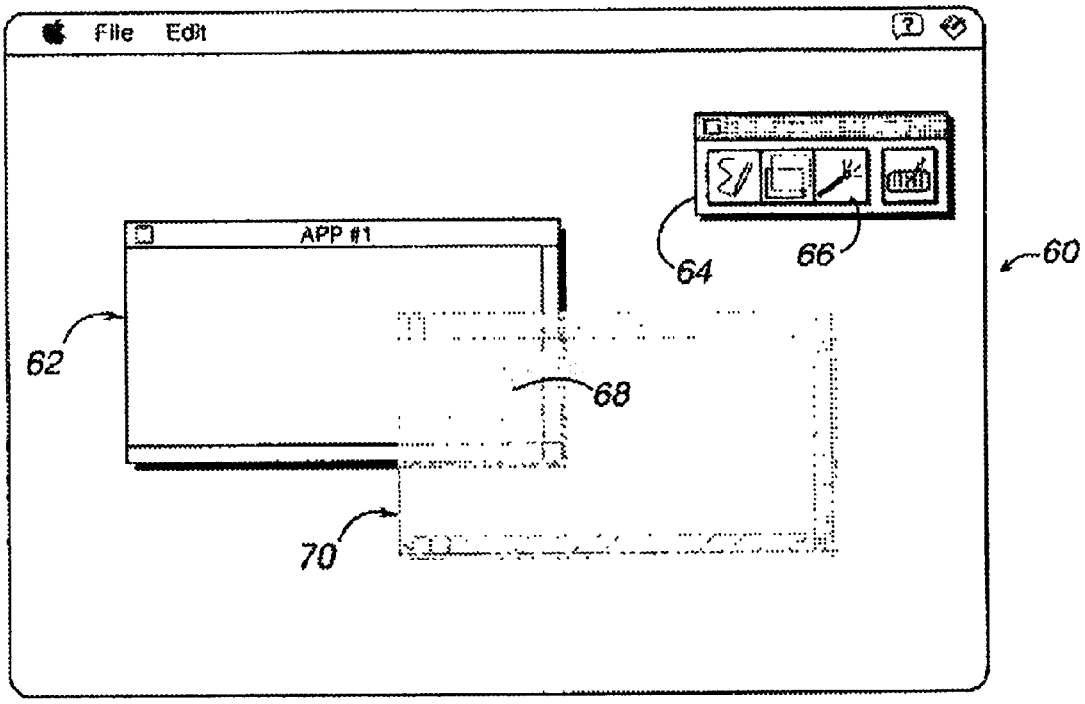
FIG. 3c illustrates an Apple Computer display screen with a pair of overlapping windows shown on one portion of the screen, the overlaying window having been rendered translucent, the opaque window portion within the overlapping region of the two windows having the image of a circle displayed, and a gadget bar including a wand icon for transforming the overlay window been opaque and translucent states.

FIG. 3c illustrates a display screen 60 with the pair of overlapping windows 62 and 70 shown on one portion of screen 60. In this Figure, the overlaying window 70 has been rendered translucent. Further, opaque window 62 has the image of circle 68 displayed within the overlapping region of the two windows 62, 70. Finally, gadget bar 64 including wand icon 66 for transforming a selected one of windows 62, 70, is shown. This permits image operations to be conducted in translucent overlaying window 70 with reference to the image of circle 68 in window 62. Image operations can be any kind of operation conducted on an image or window. Drawing an image, placing an image, or for that matter modifying, moving, expanding, or changing an image or a window, are considered to be image operations. Alternatively, according to a preferred version of the invention, another image in opaque window 62 or elsewhere could be the subject of image operations with overlay window 70. An example of one image operation which could be implemented, is simply the operation of copying or tracing the image of circle 68 from the opaque window 62 onto translucent window 70.

It should be noted that, in this preferred embodiment, wand icon 66 is used to designate the overlay task which is tested in step 48 of FIG. 2. If the active window is opaque, a selection of wand icon 66 will indicate a "translucent request," and if the active window is translucent, a selection of wand icon 66 will indicate an "opaque request." Wand icon 66 is preferably selected by a tap of stylus 38 over the icon 66.

Figure 3D:
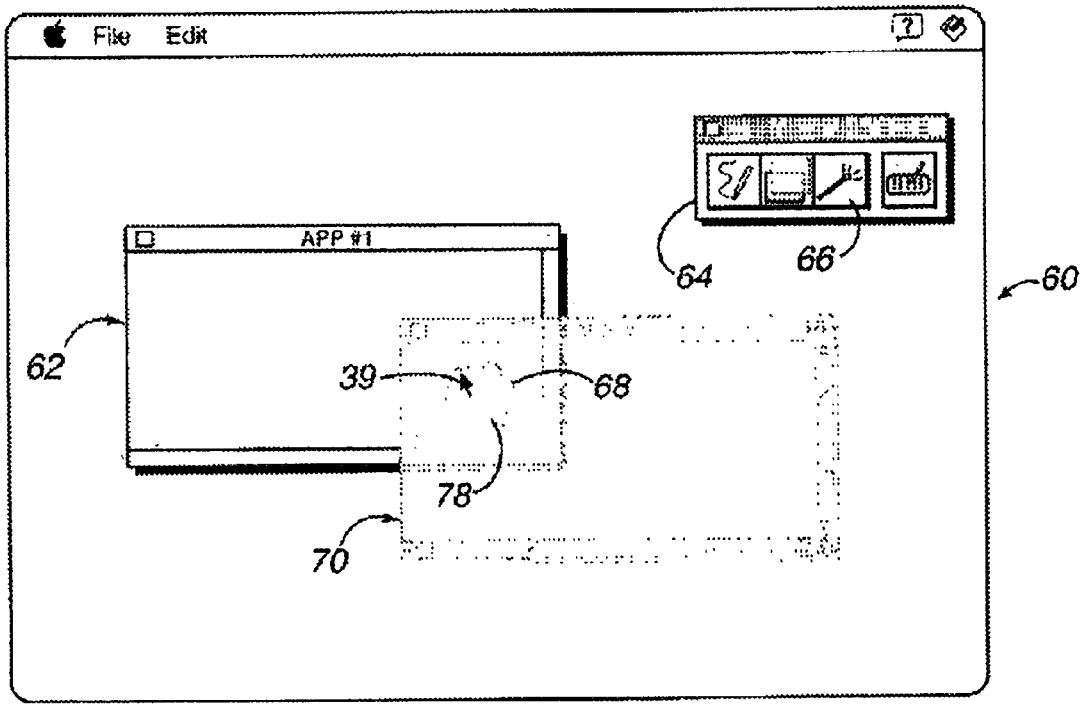
FIG. 3d illustrates an Apple Computer display screen with a pair of overlapping windows shown on one portion of the screen, the overlaying window having been rendered translucent, the opaque window portion within the overlapping region of the two windows having the image of a circle displayed, there being an additional circle image traced over the underlying circle in the opaque window, that additional circle being traced as an image in the translucent window which translucently is superimposed over the opaque window in the overlap region of the two windows, and a gadget bar including a wand icon for transforming the overlay window been opaque and translucent states.

FIG. 3d illustrates display screen 60 with overlapping windows 62 and 70 shown on a portion of the screen 60. The image operation suggested above has been accomplished and the circle 68 has been traced onto the translucent window 70 as a circle 78 based upon or with reference to the images established in window 62. This new circle 78 on translucent window 70 may be of the same size, larger, or smaller, than circle 68. Further, it may be offset from the corresponding location of opaque window 62. The object is simply to provide the user with ideas, choices or alternatives in connection with a secondary image or window which is created by reference to information contained in a primary image or window. Additional circle 78 is conveniently created by the user either by tracing directly upon the display screen over the underlying image on the screen based upon circle 68 with stylus 38, or by moving cursor 39 active at the window 70 to define the circle or other image subject to image operations, with a mouse, track ball, stylus, or the like. By thus acting and tracing an image, the user thus implements a selected computer implemented process and the process receives screen inputs which contact or are otherwise associated with a particular window as the computer implemented process is effective for processing the screen inputs. According to one version of the invention, it is a second computer implemented process which receives screen inputs which contact or are otherwise associated with a translucent window, and the second computer implemented process effectively processes the screen inputs.

Figure 3E:
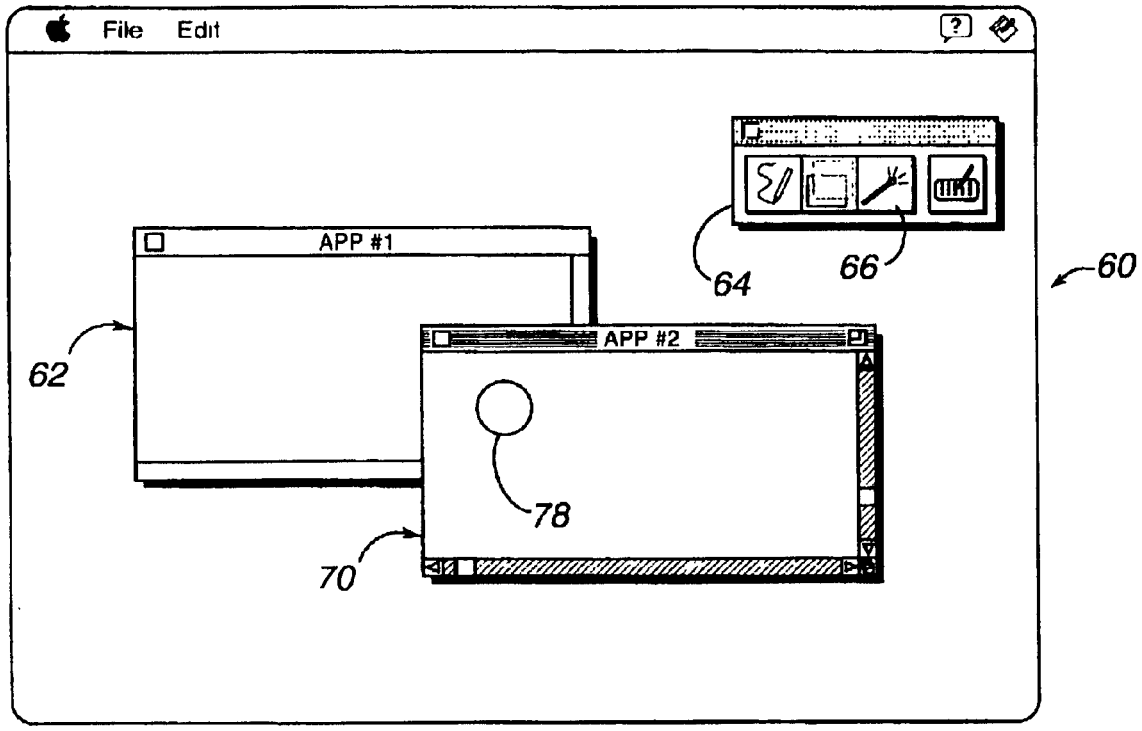
FIG. 3e illustrates an Apple Computer display screen with a pair of overlapping opaque windows shown on one portion of the screen, the overlaying opaque window displaying the traced circle made during the window's translucent phase, and a gadget bar including a wand icon for transforming the overlay window been opaque and translucent states.

FIG. 3e illustrates display screen 60 with overlapping opaque windows 62, 70, made by respective application programs APP#1 and APP#2. In particular, FIG. 3e shows window 70 after it has once again been made opaque displaying traced circle image 78 made during the window's translucent phase, and gadget bar 64 which includes wand icon 66.

Accordingly, by following the steps of FIGS. 3a–3e, the user has been able to conduct image operations and to make traces or reference images based upon the underlying circle image 68 onto overlay window 70. Window 70 has been created by its own application program, i.e., APP#2, as an opaque window in the first instance (FIG. 3b), which has then been converted into translucent window (FIG. 3c) to enable desired image operations to be conducted between the two windows. In particular, the image of interest was the circle image on the opaque, underlying window 62. The tracing operation was illustrated in FIG. 3d and, in FIG. 3e, the window 70 was made opaque again Translucency and opaqueness can be selected in a variety of manners, such as by express keyboard commands. Furthermore, a user may perform a number of image activities in the translucent window with reference to underlying opaque window 62. In this case, the user has selected a simple tracing operation to duplicate the image of underlying circle 68, albeit with a slightly smaller radius. The process of the invention accordingly permits the accomplishment of any of a range of desired tasks. For example, if instead of circle 68, a complex image of a photograph of a house were displayed in opaque window 62, according to the process of the invention, a translucent overlay window could be suitably positioned thereover, permitting the user to make a sketch of selected features of the house on the overlying translucent window.

Figure 3F:
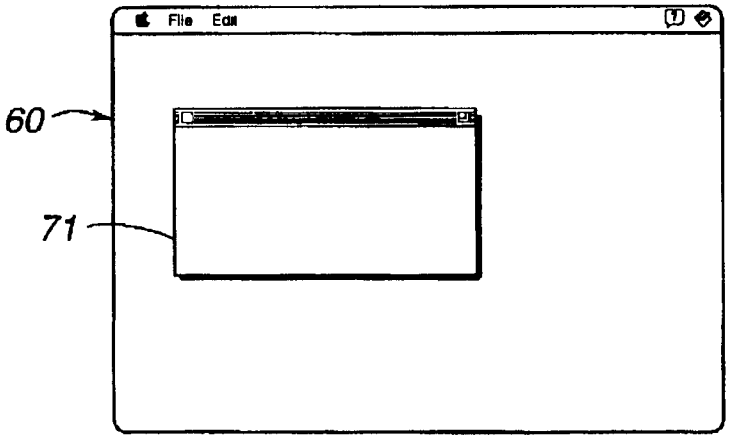
FIG. 3f illustrates an Apple Computer display screen with a single non-translucent window shown on one portion of the screen, and a gadget bar including a wand icon for transforming the overlay window been opaque and translucent states.
Figure 3G:
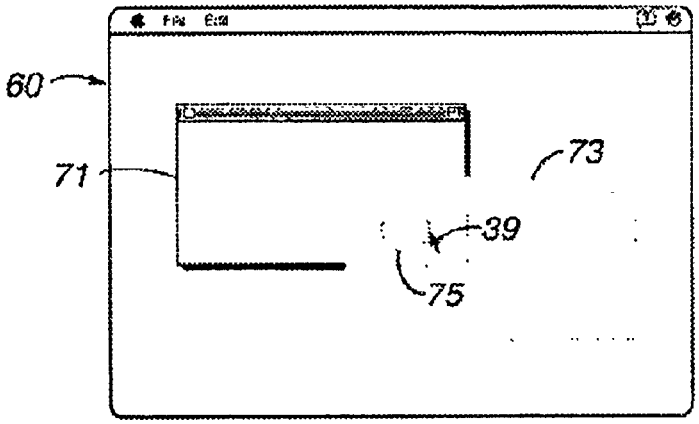
FIG. 3g illustrates an Apple Computer display screen with a pair of overlapping windows shown on one portion of the screen, the overlay window of the pair being translucent and having an circle image in the overlapping region of the two windows, and a gadget bar including a wand icon for transforming the overlay window been opaque and translucent states.
Figure 3H:
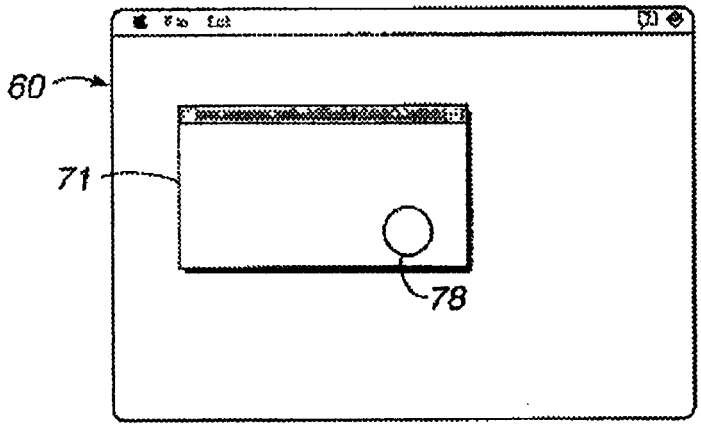
FIG. 3h illustrates an Apple Computer display screen with a single non-translucent window shown on one portion of the screen, the non-translucent window including the image of a circle which was created by tracing under the translucent circle image shown in FIG. 3g, and a gadget bar including a wand icon.

An alternate version of the invention is shown with reference to FIGS. 3f–3h. According to this version, in the figure sequence which follows, the active screen (or "reactive screen," as it might be called, because it is responsive to external influences) or window will be considered to be the opaque window underneath at a selected lower level, while the overlying translucent window 62 carries a selected image of interest with reference to which image operations are to be performed in the underlying opaque window 70. Toward this end, FIG. 3f illustrates display screen 60 with a single non-translucent window 71 shown on one portion of screen 60. Gadget bar 64 is omitted for simplicity, but may be present for providing the functionality described previously. The non-translucent, opaque window 71 is initially completely blank, in this example. Thus, while in the sequence of figures starting with FIG. 3a the image operations conducted were performed on the active overlying window 71 (which was translucent), the image operations in the figure sequence starting with FIG. 3f entail image operations on the active underlying window 71, while a translucent window 73 (See FIG. 3g) is passive and is employed for reference with regard to operations conducted on the underlying window 71 below. It is considered typical that cursor operations are treated as happening on the active screen, whether it is the underlying opaque screen or the overlying translucent screen on which the activity is taking place.

FIG. 3g illustrates this in display screen 60 with a pair o overlapping windows 73, 71. The Figure shows overlay window 73 on on portion of screen 60. Overlay window 73 is translucent and has a circle image 75 in the overlapping region of the two windows, 73, 71. In this case, cursor 39 is non-reactive as to the overlay window 73. However, cursor 39 is operative in the underlying, opaque window 71, below translucent overlay window 73. Accordingly, since the cursor is active on the underlying window 71 and the desired, or selected, image 75 is to be established in the translucent window 73, tracing along its image can be accomplished by sketching underneath image 75.

FIG. 3h illustrates display screen 60 with single non-translucent window 71 shown on one portion of the screen. Non-translucent window 71 includes the image of a circle 78 which was created by "tracing" under translucent circle image 75 shown in FIG. 3g. At this stage, the desired image 78 sought to be created has been made, and translucent window 73 has been "closed," i.e., removed from view on screen 60.

Figure 3I:
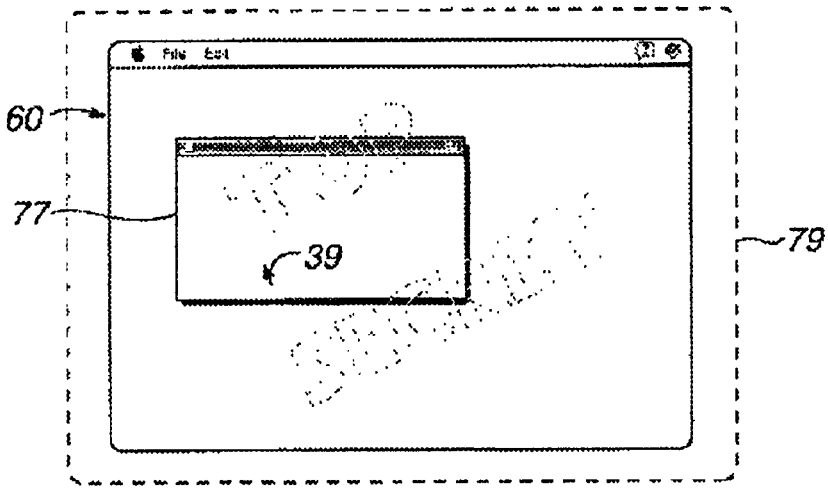
FIG. 3i illustrates the display screen of the prior figures including an opaque window having an overlay translucent window superimposed thereover with a predetermined translucent image, in this case the legend "TOP SECRET;"

FIG. 3i illustrates display screen 60 of the prior figures including an opaque window 77 selected for image operations. Opaque window 70 is "overlain" with an overlay translucent window 79 which, in this case, is larger than the display screen 60. Formed within window 79 is a translucent image including the legend "TOP SECRET." Overlay window 79 is non-reactive, and thus no image operations within overlay window 79 are permitted. Image operations below overlay translucent window 79 are considered generally independent of and not with reference to the particular translucent image on overlay translucent window 79. Preferably, cursor 39 operates "under" the overlay window 79 to perform operations at a lower level or at one or more of lower levels underneath overlay window 79, such as within opaque window 77, according to an embodiment of the invention. The object of having the translucent overlay in this case is simply to warn of the security status of the underlying information as "Top Secret." The user can accordingly work with the underlying opaque window 77 with the image operations and cursor movements desired, and as though the overlay translucency did not even exist except visually to the user. In the case of this embodiment, the translucent overlay is completely passive and the information on the translucency is generally though not necessarily external information and not typically specific information relevant to the image operations being conducted on any underlying active window or image With respect to the question of precisely how the image operation outlined in FIGS. 3a–3i may be conducted in accordance with a preferred embodiment of the present invention, reference is made to FIG. 4. In particular, FIG. 4 illustrates a "coordinate space" 80 on which selected images are expressed, which is standard on all Macintosh brand computers from Apple Computer, Inc. of Cupertino, Calif. In this case, operating system screen 81 for a selected monitor being employed by the user is shown. Further, there is shown a portion 80' of coordinate space 80 reserved for non-physical monitor representations, on which, in turn, a region is reserved for expression of the translucent overlay screen 82. The images on the respective operating system and translucent or overlay screens, respectively 81 and 82, are combined, or "blended" as will be discussed below, for loading into a video random access memory (VRAM) 85 and subsequent presentation on display screen 60 of display assembly 20.

The coordinate space 80 defined for the particular computer system 10 ranges from coordinates (−32,767; −32,767) to (+32,767; +32,767), thereby defining the space in terms of a selected pair of diagonal corner points. The top left corner coordinate points of the respective operating system and translucent or overlay screens, respectively 81 and 82, are respectively, for example, (0,0) and (0',0'). The blending process to be discussed below essentially blends the domains of the respective coordinate image screens 81 and 82 together for display on screen 60. According to a preferred version of the invention, the blended or overlapping regions are displayed on screen 60 as 50% half-tone images, whether in color or otherwise.

Figure 5A:
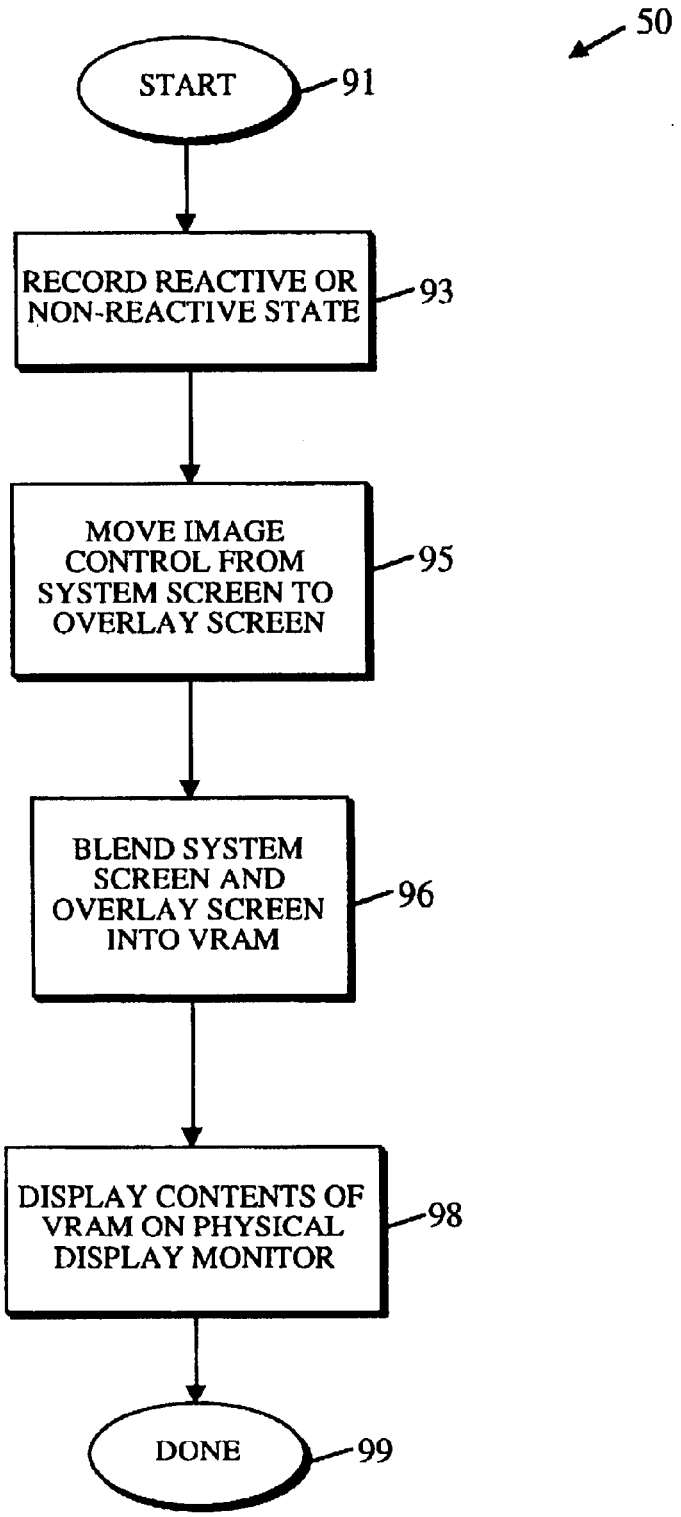
FIG. 5a is a flow diagram showing the basic steps to accomplish presentation of a translucent image according to the invention herein.

FIG. 5a is a flow diagram showing the basic steps to accomplish presentation of translucent or overlay images according to the invention herein, and within the scope of process step 50 shown in FIG. 2, calling for the creation of a translucent image. The general process begins at step 91. At a next process step 93, the operating system records entry of a particular window or image into a reactive or non-reactive state of operation. By way of reference, a non-reactive state of operation for a translucent window is generally considered to be a mode of operation in which cursor operations and activities are performed on another window or image. Similarly, when image operations are to be performed on a translucent window or image, the translucent window is considered to be reactive. In either case, whether or not operations as to particular window or image are in the reactive or non-reactive state, operation is conducted at step 95 to create an overlay screen image which is represented on coordinate space 80' in its overlay screen 82. Next, according to step 96, the separate images in screens 81 and 82 are combined or "blended" according to operations to be discussed below. After blending operation has been completed, the results of blending are loaded into VRAM 85 to create the combined image established on display screen 60, according to step 98. At this point, operations are considered to be completed, according to step 99.

Figure 5B:
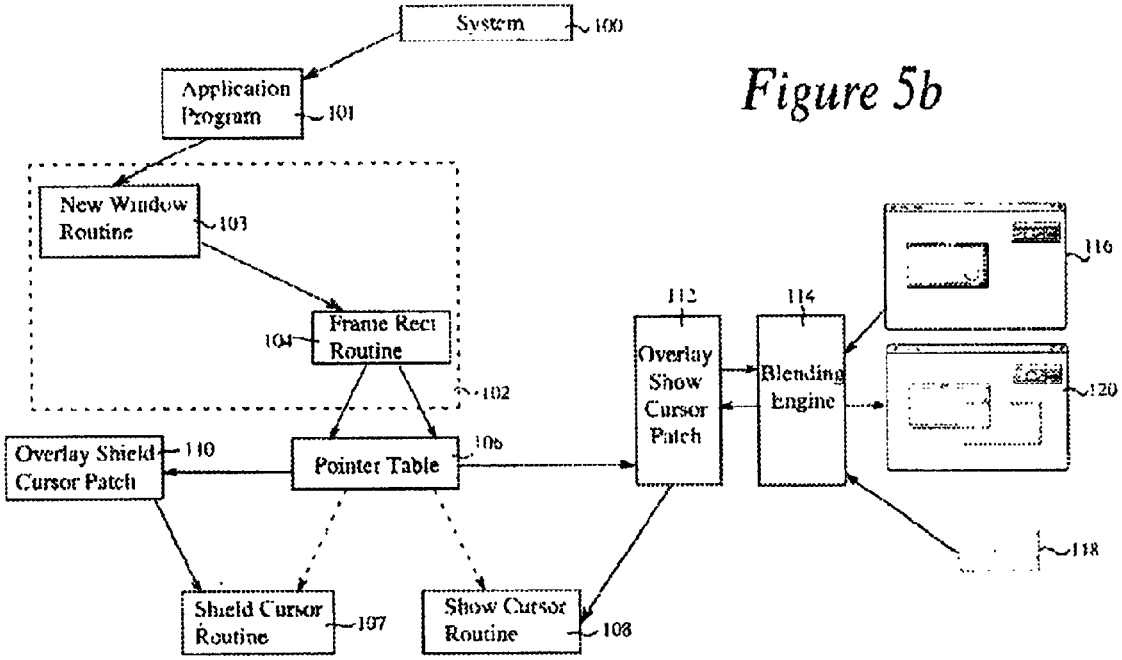
FIG. 5b is a diagram illustrating the process of displaying E translucent image, according to the invention herein.

FIG. 5b is a diagram illustrating the process of displaying a translucent or overlay image in connection with an associated underlying opaque image or window within the scope of the invention herein. In particular, FIG. 5b shows the operating system, application program, overlay utility, system routines, etc, in hierarchical fashion. At the highest level is operating system 100 of computer system 10 of FIG. 1.

Running under the operating system 100 is an application program 101, such as the AppleShare application program. Application program 101, when it wants to open a window such as window 62 of FIG. 3a, calls a set of routines 102 provided by the operating system 100. The window opened is automatically active, as the newest window created or activated. Another window or image can be activated merely by user selection in positioning the cursor over the window or image and clicking on the mouse, trackball or another applicable interface device. More specifically, in the Macintosh operating system, application program 101 calls a "New Window"routine 103 which, in turn, calls a "Frame Rect" routine 104. The Frame Rect routine uses a pointer table 106 to call a "Shield Cursor" routine 107 and a "Show Cursor" routine 108. If the application program 101 were running on system 100 without the process 133 (see FIG. 6a) of the present invention, this would be the entirety of the calls to open up the window 79 of FIG. 3b. This process is extensively documented in the multi-volume reference set, Inside Macintosh, by C. Rose et al., Addison-Wesley Publishing Company, Inc., July 1988 and is well known to those skilled in the art of programming on the Macintosh operating system.

Figure 5C:
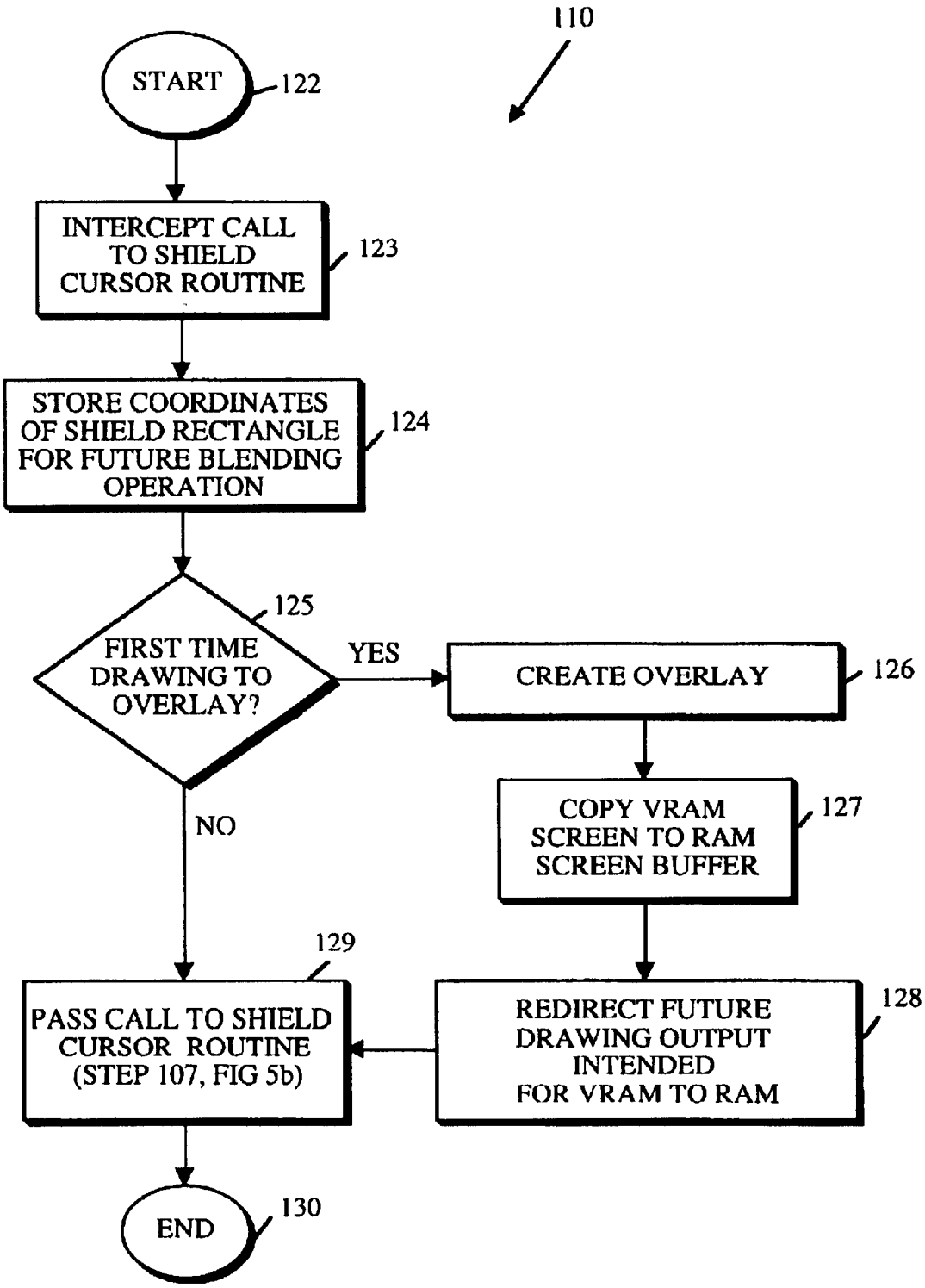
FIG. 5c is a diagram illustrating the process of performing at overlay shield cursor patch operation as discussed herein.

FIG. 5c illustrates the "Overlay Shield Cursor Patch" process 110 of FIG. 5b in greater detail. The process 110 begins at 122 and, in a first step 123 the call from the Frame Rect routine 104 to the Shield Cursor Routine 107 (see FIG. 5b) is intercepted. This is accomplished by modifying the pointer table 106 such that the process control jumps to the Overlay Shield Cursor Patch address area rather than the Shield Cursor Routine area 107 upon a call from the Frame Rect routine 104. The Overlay Shield Cursor Patch routine 110 must however, remember the proper address for the Shield Cursor Routine so that the process control can be passed to the Shield Cursor Routine 107 at the appropriate time. Next, in a step 124, the coordinates of the shield rectangle are stored for future blending operations. The shield rectangle is essentially the rectangle of the window to be developed by the application program, such as the window 116. The coordinates of the shield rectangle can therefore be fully described with two corner coordinates, as is well known to those skilled in the art of programming on the Macintosh computer system. Next in a step 125, it is determined whether this is the first time that the application program 101 is drawing to the screen 60 after an overlay image has been produced. If it is, a step 126 creates an overlay buffer, and the image of the screen that is stored in the video RAM (VRAM) is copied from the system's VRAM to a RAM screen buffer provided in general system RAM, according to step 127. Next, in a step 128, the system is set such that future drawing output which is intended, by the operating system, to go to VRAM is sent to the RAM screen buffer of the present invention instead. Finally, the call made by the Frame Rect routine 104 is finally passed to the Shield Cursor Routine 107 in a step 129, and the process is completed as indicated at step 130.

The implementation of computer process 133, as will be seen with reference to FIG. 6a, is effective to implement an overlay utility application process effective to modify the normal flow of routine calls implemented by a particular application program 101 as follows. First, application program 101 calls New Window routine 103 which in turn calls Frame Rect routine 104. Frame Rect routine 104 next attempts to call the Shield Cursor Routine. However, according to the invention, Frame Rect routine 104 instead calls a portion of a process of step 138 of FIG. 6b known as the Overlay Shield Cursor Patch 110, which will be discussed below. This is accomplished by having process 138 modify the pointer table 106 such that when the Frame Rect routine 104 is trying to call the Shield Cursor Routine 107, it, instead, calls the Overlay Shield Cursor Patch 110. After Overlay Shield Cursor Patch 110 completes its process, Shield Cursor Routine 107 is called. As far as the Frame Rect routine 104 is concerned, it does not know of the diversion of process control to the Overlay Shield Cursor Patch process 110, and instead believes that it directly called the Shield Cursor Routine 107.

When the Frame Rect routine 104 goes to pointer table 106 in an attempt to call Show Cursor Routine 108, process control is instead diverted to a process 112 known as "Overlay Show Cursor Patch." The Overlay Show Cursor Patch process 112 interacts with a Blending Engine process 114 to blend a first screen image 116 (see FIG. 5b) generated by the Macintosh operating system and the application program, with a second, "overlay" image 118 to form the blended image 120. After the completion of blending process of step 114, Overlay Show Cursor Patch process 112 turns over process control to the "Show Cursor Routine" process 108. Again, as far as the Frame Rect routine 104 is concerned, it made a direct call to the "Show Cursor Routine" 108 and was ignorant of the diversion of the process control to the Overlay Show Cursor Patch 112 and the Blending Engine 114.

In FIG. 6a, the process in accordance with the present invention for implementing translucent overlay image operations is shown beginning at process step 131. At step 132, a selected application program is started, loaded, or "executed" on computer system 10 to produce a particular image or window desired for image operations either within its own right or with reference to another image or window. The application program could for example be the AppleShare application program which produced window 62 on screen 60. Next, in step 133, the "overlay utility" is started or "executed" on computer system 10. This "overlay utility" is an application program (often referred to as a "utility" or "routine") which implements the computer process of the present invention. Step 133 may include, for example, activating the wand icon 66 of gadget bar 64 shown in FIG. 3a. After performance of a range of other selected activities, the process is completed as indicated at step 134.

In FIG. 6b, process 133 of FIG. 6a is illustrated in greater detail. Process 133 begins at step 135, and in a step 136, it is determined, as a threshold question, whether process 133 is already to be treated as completed. In this instance, process 133 is considered to be completed when a particular "button" of the translucent selected image is tapped. If the process is in fact completed, overlay utility 133 is terminated as indicated at 137. If the process is not completed, step 138 displays a translucent or "overlay" image on the screen such that images on the screen that it overlaps can be seen through the overlay image. Of course, other overlay images besides selected images can be provided by the present invention, e.g. handwriting "recognition" windows, etc. Alternatively, translucent windows or images can overly other translucent windows or images. Next, in a step 139, the overlay utility intercepts screen inputs which contact the overlay image, and these screen inputs are processed. Finally, in a step 140, the active application program which is executing in step 132 of FIG. 6a, is updated according to the processed screen inputs. Process control is then turned over to step 136 which again determines whether the process 133 is completed.

By way of additional detail, process step 138 of FIG. 6b is effective to implement its process when Frame Rect routine 104 calls the Show Cursor Routine 108 of FIG. 5b. In that instance, when the Frame Rect routine 104 goes to pointer table 106 in an attempt to call Show Cursor Routine 108, process control is instead diverted to a process 112 known as "Overlay Show Cursor Patch."

Figure 7:
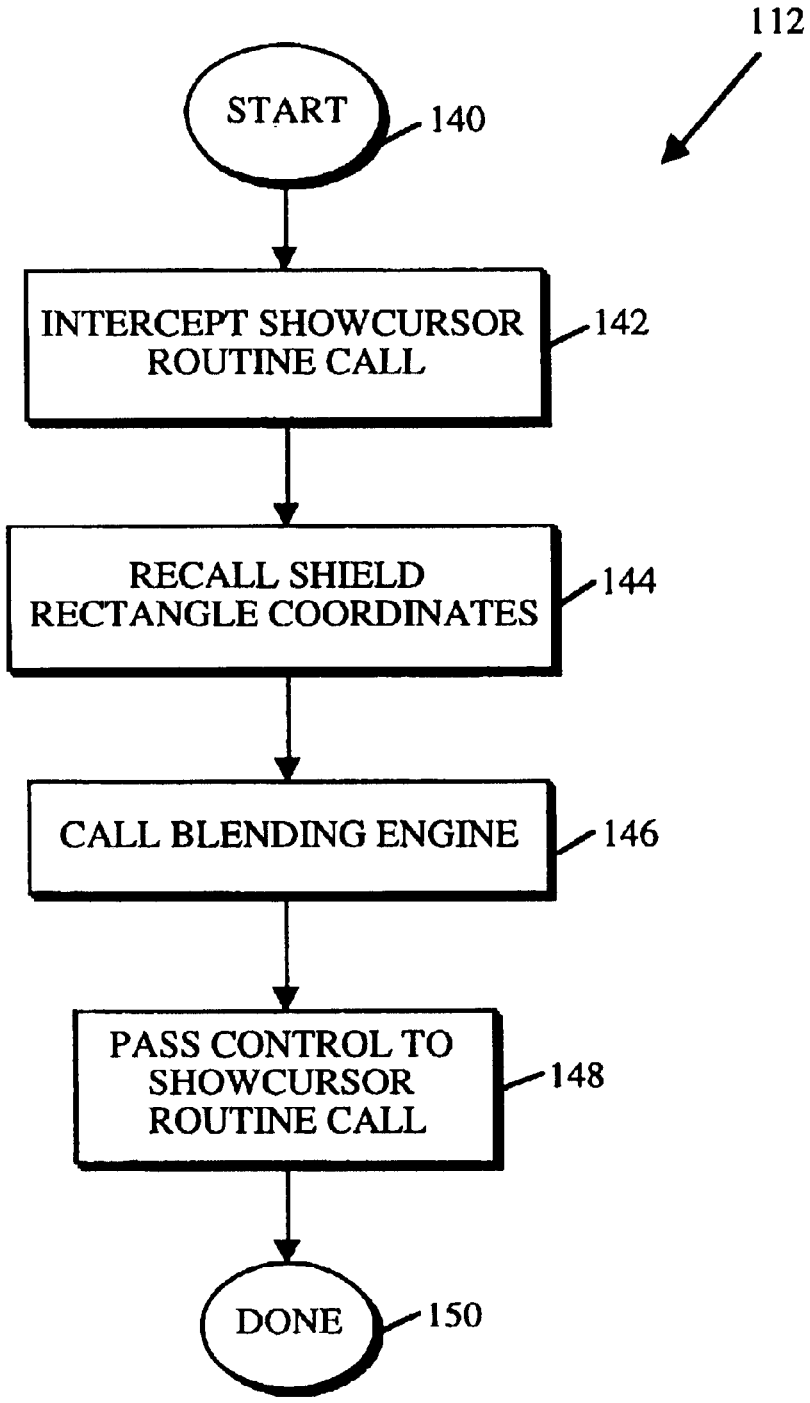
FIG. 7 is a flow diagram illustrating the "Overlay Show Cursor Patch" step of FIG. 5b.

In FIG. 7, process step 112 of FIG. 5b is described in greater detail. The process 112 begins at 140 and, in a step 142, the Show Cursor Routine call made by the Frame Rect routine 104 is intercepted. This step 142 is, again, preferably implemented by modifying a pointer table to cause process control to jump to the Overlay Show Cursor Patch 112 instead of the Show Cursor Routine 108. The starting address of the Show Cursor Routine 108 is stored by the Overlay Show Cursor Patch 112 for later use. Next, in a step 144, the shield rectangular coordinates of the window being opened by the application program 101 are recalled. These coordinates were stored by step 124 of the Overlay Shield Cursor Patch process 110. Next, in a step 146, the Blending Engine 114 of FIG. 7 is called. After the Blending Engine 146 has completed its process, a step 148 passes the process control back to the Show Cursor Routine 108 such that the Frame Rect routine 104 had no knowledge of the intervening steps 112 and 114. The process is then completed as indicated at 150. The "Blending Engine" process 114 begins at 152 and, in a step 154, the shield rectangle is divided into individually blended units. For example, these blendable units can be anywhere in the range of 1 to 32 pixels, where a pixel is the smallest display unit provided on the screen 60. Next, in a step 156, the RAM screen buffer data within the shield rectangle is retrieved for one blendable unit. In a step 158, the RAM overlay image buffer from within the shield rectangle has been retrieved for the one blendable unit. The data retrieved from steps 156 and 158 is blended to form blended data in the step 160. Next, in a step 162, the blended data is written to VRAM to be displayed on the screen 20. Next, in a step 164, it is determined whether all of the blendable units created by step 154 have been blended by the process steps of 156–162. If not, the loop comprising steps 156–164 is repeated. If step 164 determines that all blendable units have been blended, the call that was initially made by the Frame Rect routine 104 is passed to the Show Cursor Routine 108 in a step 166, and the process is completed at 168. Again, the Frame Rect routine 104 is unaware of the activities of process 114 and, instead, believes that its call was passed directly to the Show Cursor Routine 108 for processing.

Figure 8:
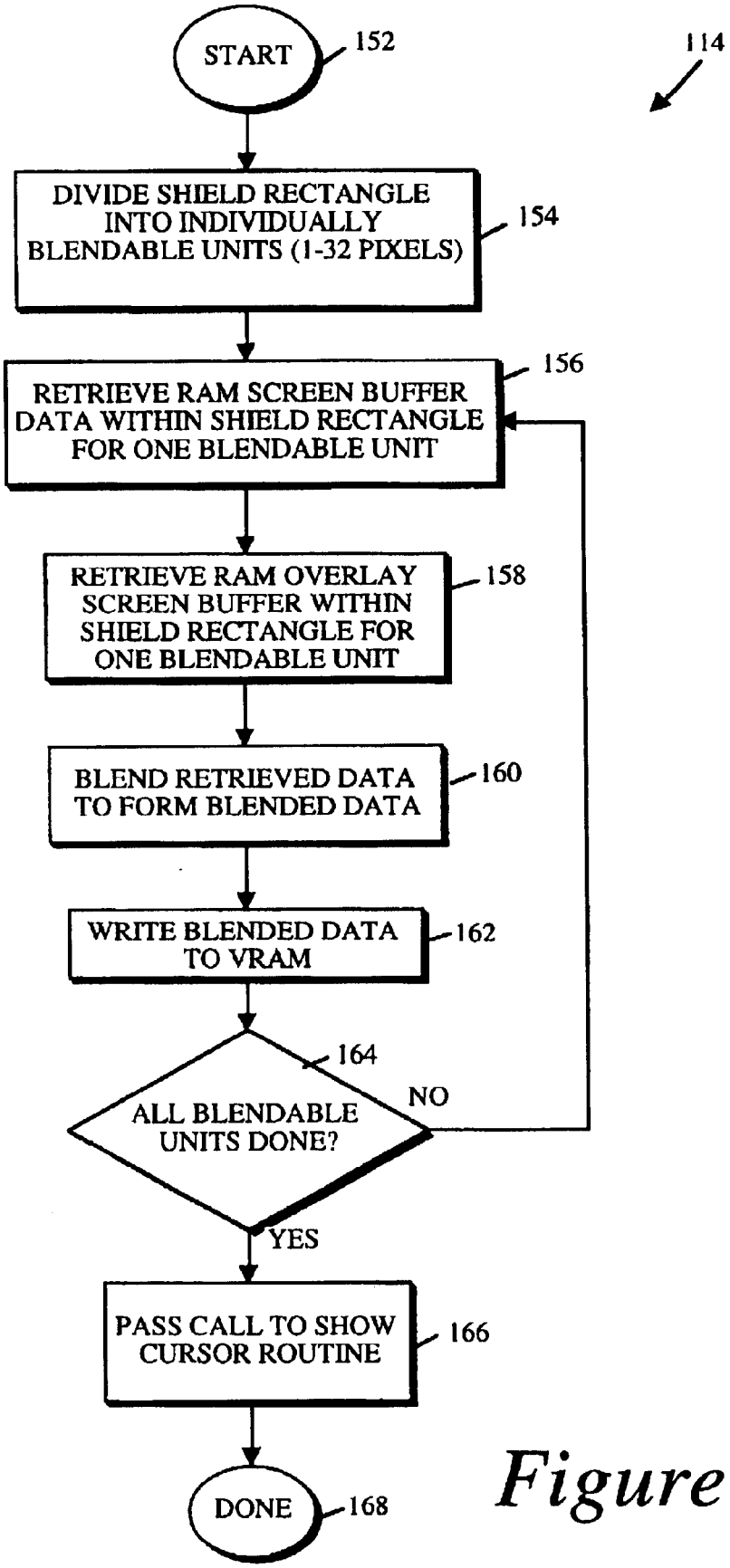
FIG. 8 is a flow diagram illustrating the "Blending Engine" of FIG. 5b.

FIGS. 8a–8f are used, as an example, to further explain the process 114 of FIG. 8. FIG. 8a represents the RAM shield buffer within the shield rectangle, and has been divided into 16 individually-blendable units. These units are arranged in a four-by-four matrix, where the rows have been numbered 1, 2, 3, and 4. FIG. 8c illustrates the RAM screen overlay buffer in the shield rectangle, and again has 16 individually-blendable units formed in a four-by-four array, with the rows numbered 1, 2, 3, and 4. In FIG. 8c, the row 1 from FIG. 8a and the row 1 from FIG. 8b are blended together to form a blended row 170c. In FIG. 8d, rows 2 from FIGS. 8a and 8b are blended together to form a blended row 170d. In FIG. 8e, rows 3 and 4 are blended together to form a blended row 170e, and in FIG. 8f rows 4 from FIGS. 8a and 8b are blended together to form a blended row 170f. This "blending" process allows a base image (opaque or translucent) on the screen 60 to be seen through a translucent overlay image produced by the process of the present invention.

Figure 9:
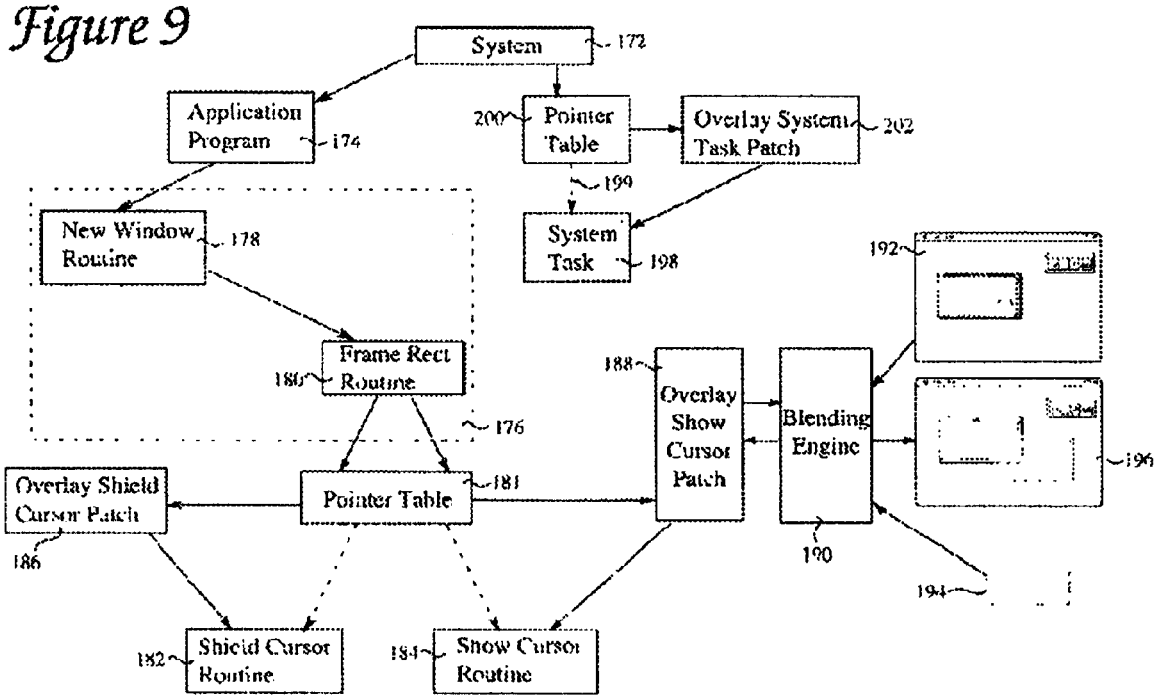
FIG. 9 illustrates an alternate embodiment of the "Display an Overlay Image" step of FIG. 6b.

FIG. 9 illustrates an alternate embodiment of the present invention which has been optimized for screen-writing speed. While the process of FIG. 8b works very well, it requires that the entirety of the base screen 116 be rewritten whenever the blended image 120 is to be refreshed. The alternative process of FIG. 9 only refreshes the portions of the blended image that need, to be refreshed, thereby greatly increasing the writing speed to the screen 60.

Much of the operation of the process illustrated in FIG. 9 is similar to that described in FIG. 5b. An operating system 172 supports an application program 174 which, when it wants to open a window, calls a set of routines 176 including a "New Window routine" 178 and Frame Rect routine 180. The Frame Rect routine 180 then, as before, attempts to first call the Shield Cursor Routine 182 first and then the Show Cursor Routine 184. Again, as before, the pointer table is modified such that when the Frame Rect routine tries to call the Shield Cursor Routine 182, it instead calls the Overlay Shield Cursor Patch 186 of the present invention, and when the Frame Rect routine 180 attempts to call the Show Cursor Routine 184, it instead calls the Overlay Show Cursor Patch 188. The Overlay Show Cursor Patch calls along a Blending Engine 190 which blends a selected first application image 192 with a translucent image 194 to create a blended image 196.

The operating system 172, as part of its functioning, will make periodic calls to various system task processes. The system task 198 performs such functions as execute "Device Driver Code" and "Desk Accessory Code."The process of the present invention opportunistically takes advantage of these periodic system task calls by modifying a pointer table 200 to turn over process control to an Overlay System Task Patch 202. This Overlay System Task Patch, with the Overlay Shield Cursor Patch 186, the Overlay Show Cursor Patch 188, and Blending Engine 190 comprise the overlay utility 133 of FIGS. 6a and 6b in this second preferred embodiment.

Figure 10:
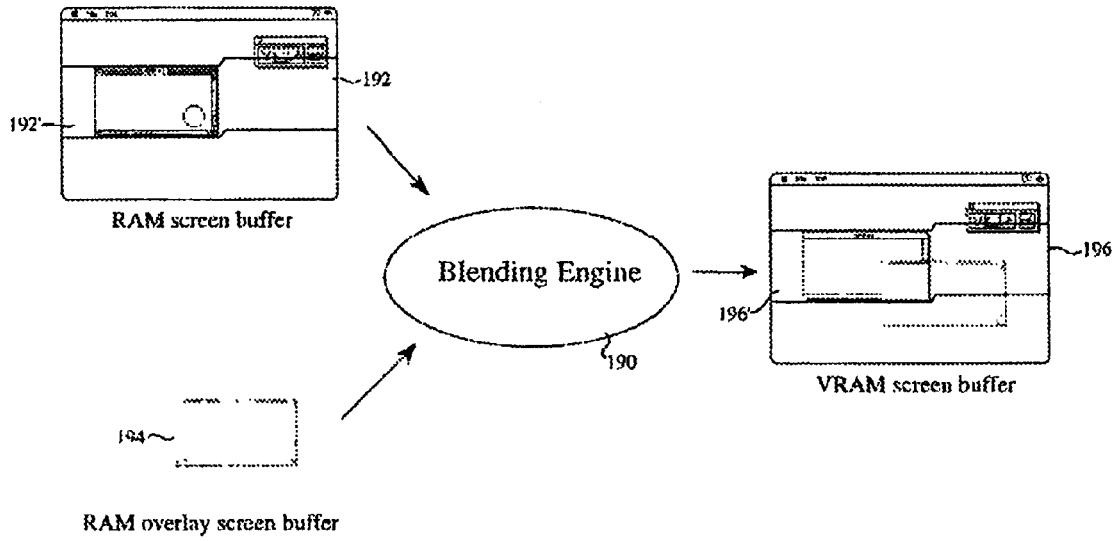
FIG. 10 illustrates the operation of the "Blending Engine" of FIG. 9.

FIG. 10 is used to illustrate the operation of the Blending Engine 190 of FIG. 9 in greater detail. The process 138 of FIG. 6b remaps certain pages of VRAM to the RAM screen buffer when a translucent image contains objects that overlap these pages. The RAM overlay screen buffer 194 is then merged with changes 192' in the RAM screen buffer 192 in the Blending Engine 190 by a process similar to that previously described and inserts the blended image into a "hole" 196' of VRAM screen buffer 196. Accordingly, only the overlapped portions of RAM screen buffer 192 and RAM overlay screen buffer 194 need to be blended to accomplish changes in VRAM screen buffer 196. VRAM screen buffer 196 is much faster memory for video purposes than the RAM screen buffer 192. These factors substantially increase the blending speed of the VRAM screen buffer and therefore of the display on screen 60.

Figure 11:
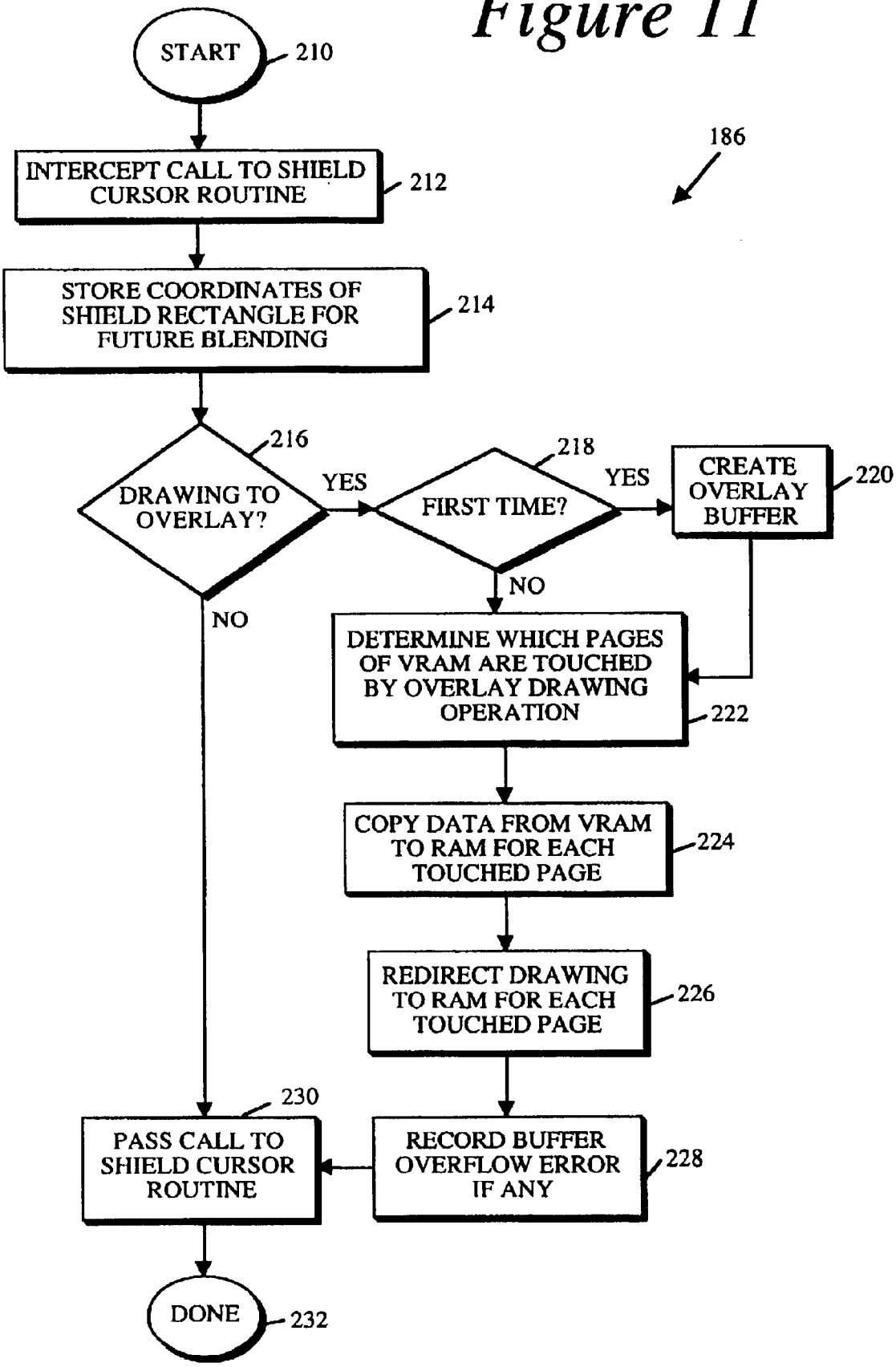
FIG 11 is a flow diagram illustrating the "Overlay Shield Cursor Patch" step of FIG 9.

FIG. 11 illustrates the Overlay Shield Cursor Patch process 186 of FIG. 9 in greater detail. Process 186 of FIG. 9 begins at step 210 of FIG. 12a and then, according to step 212, process 186 intercepts a call to the Shield Cursor Routine 182. This interception is preferably accomplished in a manner analogous to that previously described with reference to FIG. 5b. The coordinates of the shield rectangle are then stored in a step 214 of FIG. 11 for future blending operations. This is similar to the step 133 of FIG. 6a. Next, in step 216, it is determined whether there is a drawing to the overlay image of the present invention. If there is, a step 218 determines whether this is the first time that there has been a drawing to the overlay image. If it is, a step 220 creates the overlay buffer 194 of FIG. 10. If not, a step 222 determines which pages of VRAM screen buffer 196 are "touched" by the overlay drawing operation. Next, in a step 224, data is copied from VRAM 196 to the RAM screen buffer 192 for each "touched" page. Next, in a step 228, the buffer overflow error (if any) is recorded. Next, a step 230 passes the original Frame Rect routine call to the Shield Cursor Routine 182. This step 230 is also performed directly after step 216 if there was no drawing to the overlay image. The process 186 is then completed at step 232.

Figure 12A:
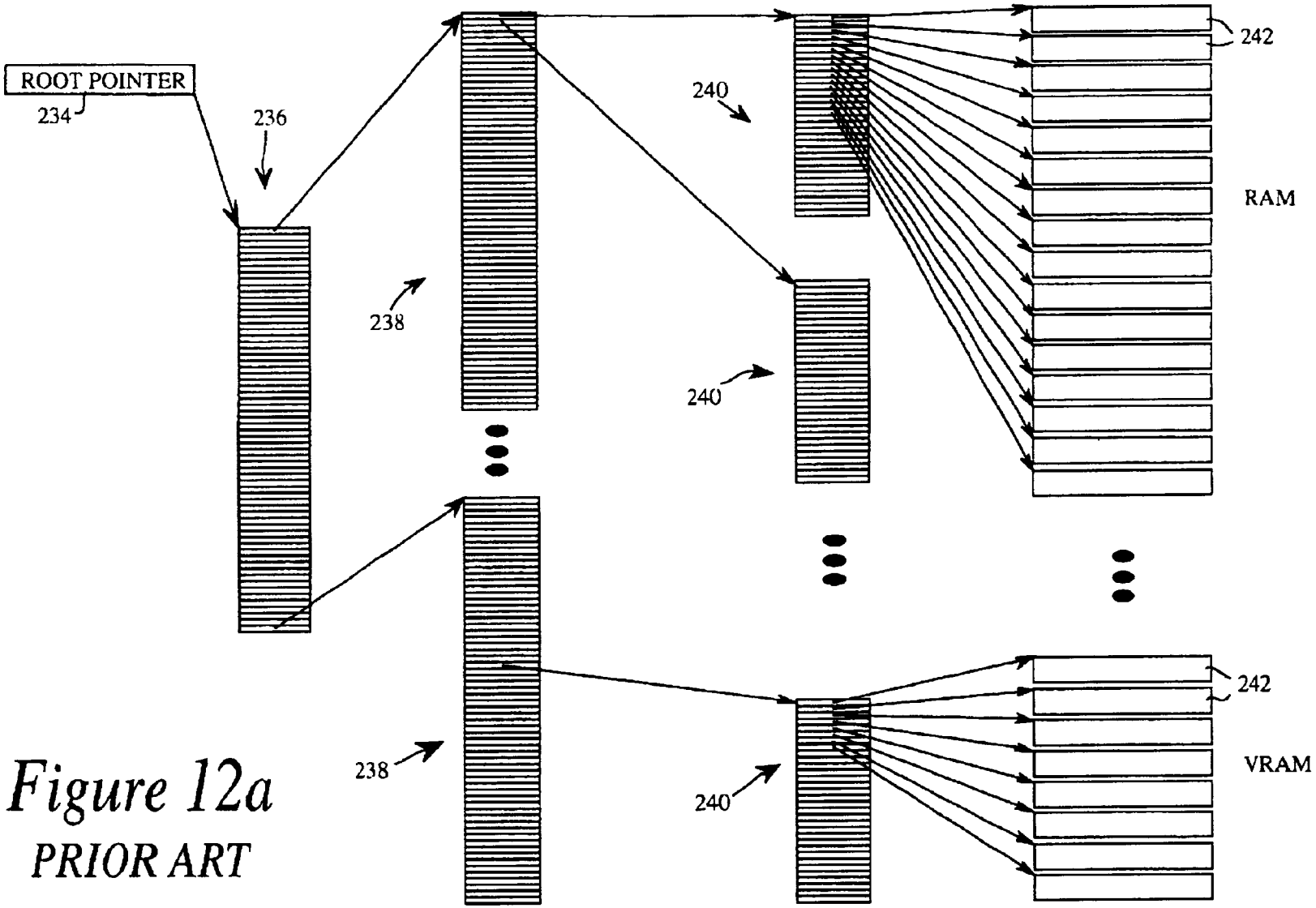
Figure 12a PRIOR ART
FIG. 12a illustrates a known memory management unit (MMU) data structure.

FIG. 12a illustrates a prior art memory management (MMU) data structure for a Macintosh computer system from Apple Computer, Inc. of Cupertino, Calif. The Macintosh computer system uses a tree-type MMU data structure in which in turn root pointer 234 points to a stack 236 of 32 megabyte (MB) pointers, each of which points to a stack 238 of 256 kilobyte (KB) pointers, each of which then points to a stack 240 of 4 KB pointers, each of which point to 4 KB physical memory pages 242. Some of these 4 KB physical memory pages reside in general system RAM, and some of these 4 KB physical memory pages reside in VRAM. This MMU data structure is well known to those skilled in the art of programming Macintosh computer systems.

Figure 12B:
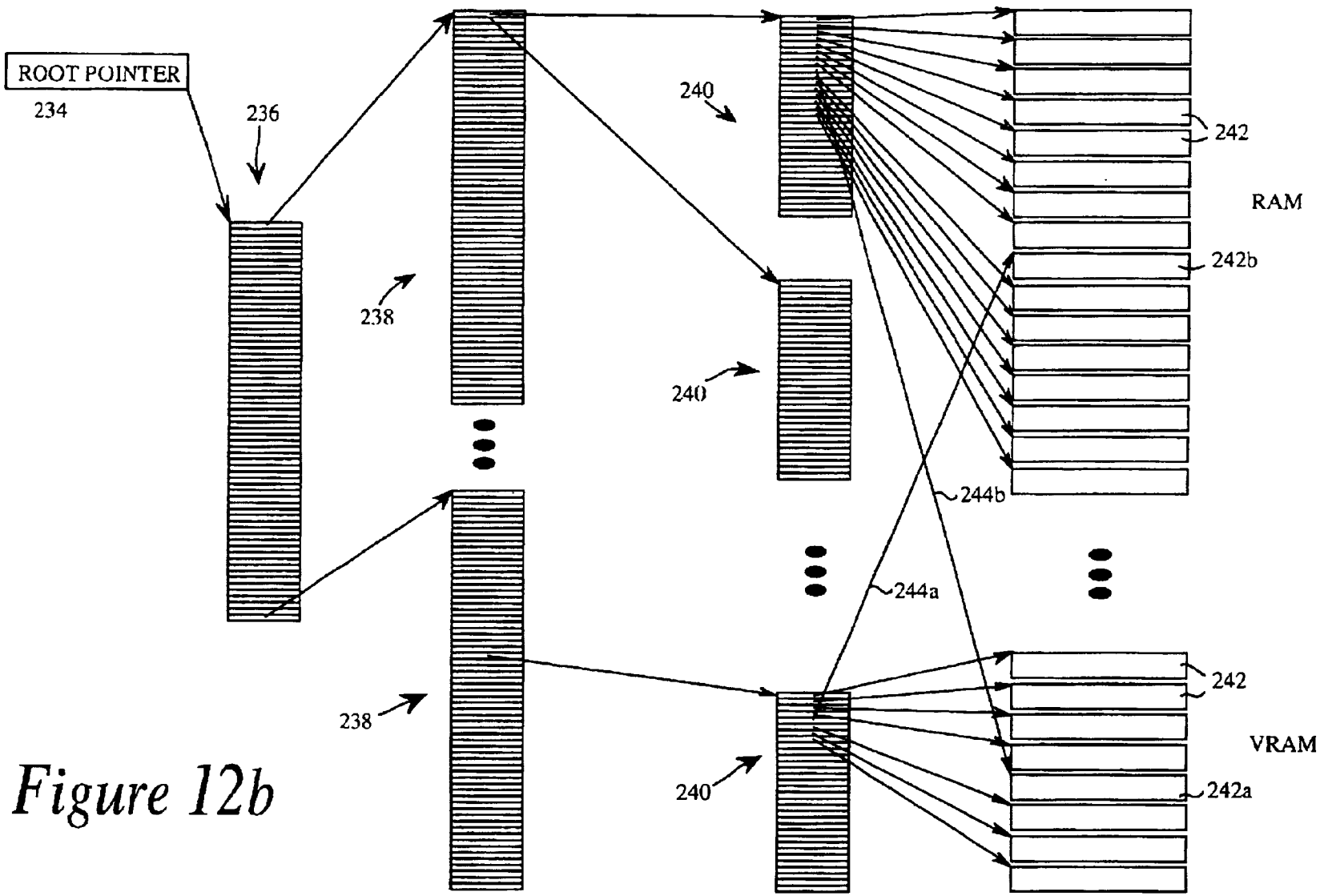
FIG. 12b illustrates a modification to the MMU data structures used to implement the "Redirect Drawing to RAM" step 226 of FIG. 11.

FIG. 12b illustrates modifications that the present invention has made to the MMU data structures to accomplish step 226 of FIG. 11. Essentially, step 226 selectively modifies some of the pointers in the 4 KB pointer stacks 240 to "trick" the system into writing images that are intended for VRAM into RAM and vice versa. For example, process 226 can redirect a pointer from the 4 KB physical memory page 242a of the VRAM to the 4 KB physical memory page 242b of the RAM as indicated by arrow 244a. Also, a 4 KB pointer of a stack 240 can be modified as indicated by the arrow 244b such that data which was to be written into 4 KB physical memory page 242b is, instead redirected to the 4 KB physical memory page 242a of the VRAM. This modification of the MMU data structure, therefore, effectively "swaps" pages 242a and 242b, thus causing a portion of the screen (as stored in the VRAM memory page 242a) to be drawn "off screen" in RAM memory page 242b.

The MMU modification of FIG. 12b takes advantage of the fact that the Macintosh operating system supports multiple monitors. These monitors exist in the aforementioned single coordinate plane, in which the upper-left corner of the main screen is the origin (the point with coordinate value (0,0)). The overlay screen exists in the same coordinate space, but it is off in an area not normally occupied by monitors. The upper-left hand corner of the overlay screen, for example, can be at coordinate (−10,000, −10,000). It is very unlikely that using this remote area of coordinate space will affect existing monitor set ups. In consequence, a "pseudo" screen is recognized by the operating system where the overlay image 194 resides. The blending operation, then, blends the images of the actual screen 60 and this "pseudo" screen which includes the overlay image.

Figure 13:
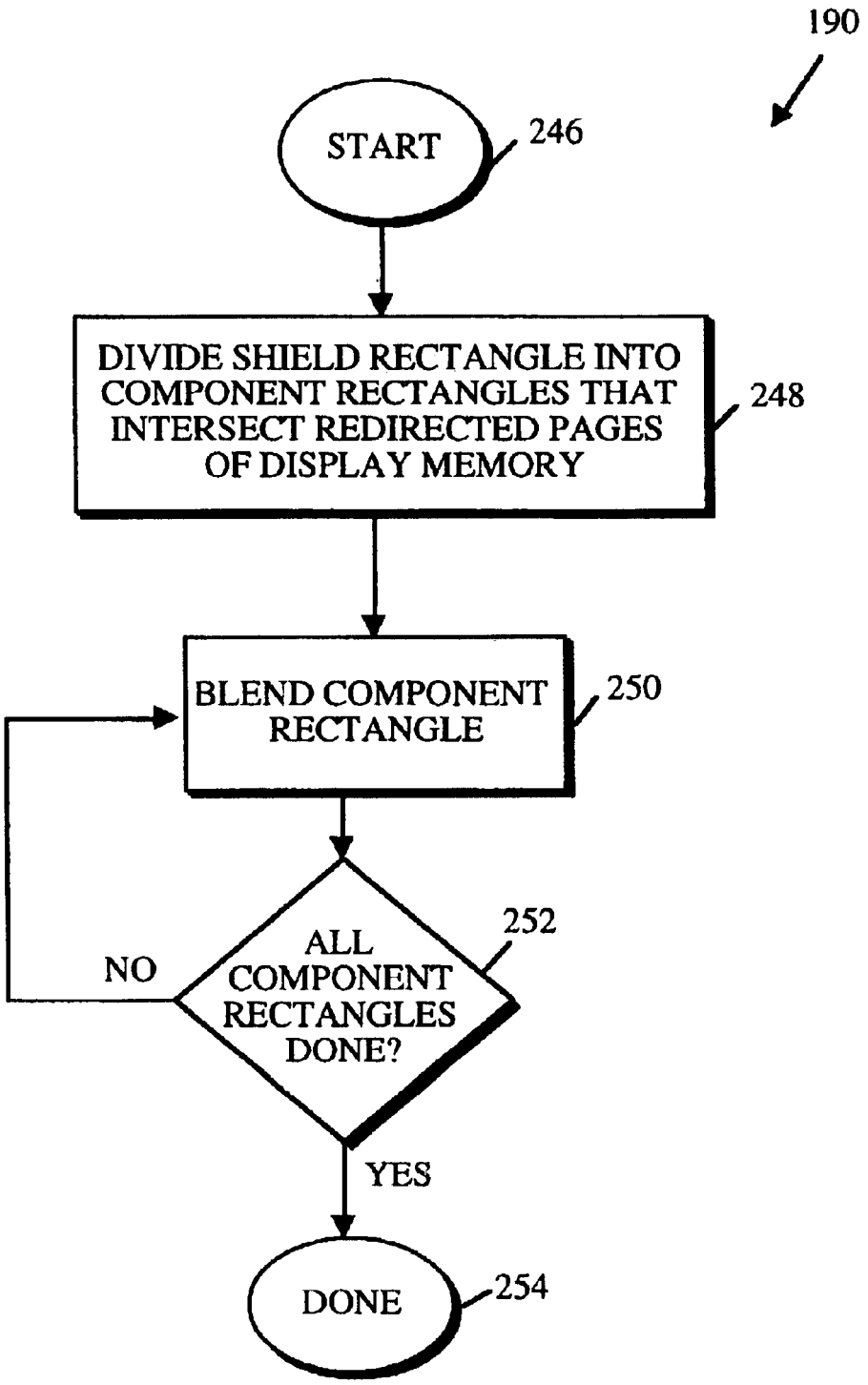
FIG. 13 is a flow diagram illustrating the operation of the "Blending Engine" 190 of FIG. 9.

FIG. 13 illustrates the process 190 of FIG. 9 in greater detail. The "Blending Engine" process 190 begins at 246 and, in a step 248, the shield rectangle is divided into component rectangles that intersect redirected pages of the display memory. The redirected page concept was explained with reference to FIG. 12b. Next, in a step 250, the component rectangles are blended. This is accomplished as previously described with reference to FIG. 8 and FIGS. 8a–8f. Next, in a step 252, it is determined whether all component rectangles have been completed. If not, steps 250 and 252 are continued in a loop until all component rectangles are done at which time the process is completed as indicated at 254.

Figure 14:
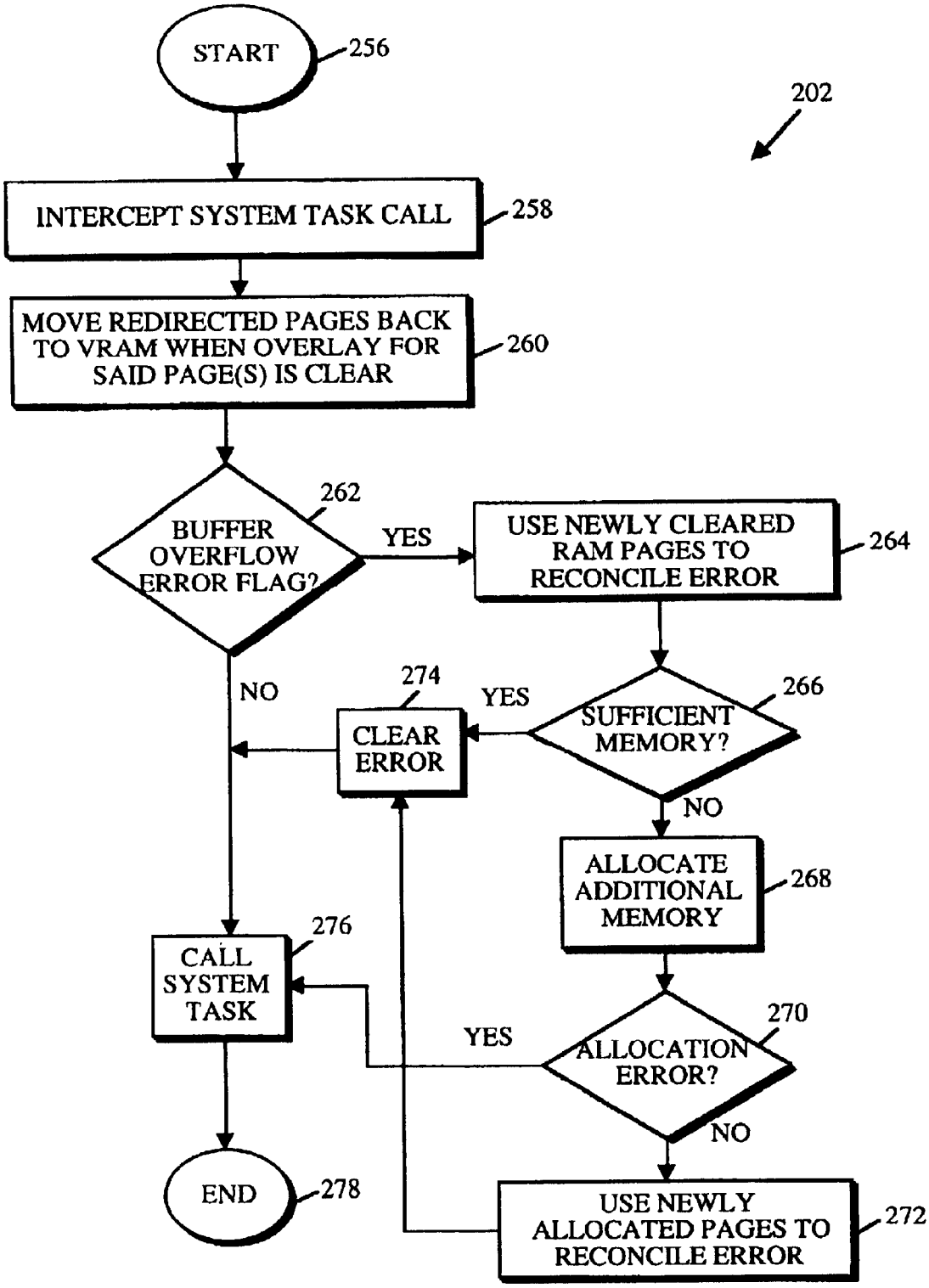
FIG. 14 is a flow diagram illustrating the "Overlay System Task Patch" step of FIG. 9.

In FIG. 14, the Overlay System Task Patch process 202 of FIG. 9 is described in greater detail. As mentioned previously, process 202 is an additional portion of the overlay utility of this second embodiment of the present invention. The process 202 needs to be implemented periodically and, since the system periodically makes calls to various system tasks, the process 202 uses these periodic system task calls to activate its processes. Alternatively, other activation methods could be used to periodically start the process 202. The process 202, starts at 256 and, in a step 258, process 202 intercepts a system task call made by system 172. Next, in a step 260, redirected pages are moved back to VRAM when the overlay image for those pages is clear, i.e., when all pixels of the overlay contain a value of zero for a given screen page. In a decision step 262, it is determined whether a buffer overflow error flag has been set. If it has, a step 264 uses the newly cleared RAM pages to reconcile the error. Then, in a step 266, it is determined whether there is sufficient memory available to complete the task. If not, additional memory is allocated in a step 268. Next, a step 270 determines whether there was an allocation error made during the allocation step of 268. If not, the newly allocated pages are used to reconcile the error in a step 272 and the error is cleared in step 274. This step 274 is also executed if there was determined to be sufficient memory in step 266. Next, the process 202 calls the system task 198 in a step 276 and the process is completed as indicated at 278. The call system task step 276 is also executed if step 270 indicates that there is an allocation error in the additional memory. The system 172 is unaware of the modification of the pointer table 200 and of the process of the Overlay System Task Patch 202 and, simply believes that the system task 198 has been called directly as indicated by arrow 199 on FIG. 9.

Figure 15A:
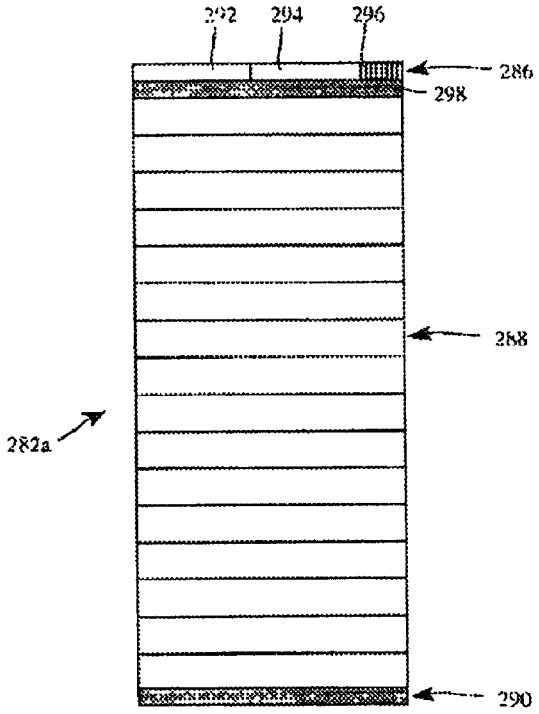
FIG. 15a and 15b illustrate a RAM memory pool format used if the present invention.
Figure 15B:
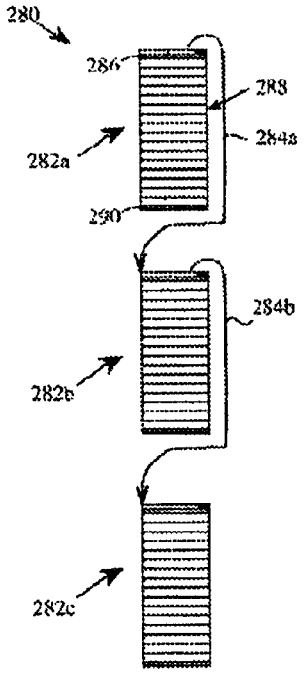

In FIGS. 15a and 15b, the preferred RAM memory pool format for the present invention is disclosed. Referring to FIG. 15b, the RAM memory pool 280 comprises a number of blocks 282a, 282b, 282c, etc. Each block preferably contains 16 pages of memory which are used to remap portions of the display monitor memory using the MMU as previously described. The blocks are chained together by pointers as represented by arrows 284. With additional reference to FIGS. 15a and 15b, each block 282 includes a header portion 286, a data portion 288, and a trailer portion 290. The header portion 286 includes two pointer portions 292 and 294 and an allocation portion 296. The header portion 286 also includes a padding portion 298. The pointer portion 292 points to the first page in the current block 282, and is preferably 32 bits in length. The pointer 294 is also preferably 32 bits in length, and points to the next block in the RAM memory pool. In this example, the pointer 294 of block 282a points to the pointer 292 of the block 282b as indicated by the arrow 284a. Similarly, the pointer 294 of block 282b points to the pointer 292 of block 282c as indicated by the arrow 284b.

The blocks are chained together as indicated in FIG. 15b. When a free page is needed, the page allocator traverses the chain searching for a block which contains a free page. When it finds one, it sets the corresponding allocation flag 296 to indicate that the page is now in use. If no free pages are found, a new block 282 is allocated, and is connected to the end of the chain. A page is then allocated from the new block.

The purpose of the header "padding" is for page alignment. The pages 288 are aligned in memory so that the MMU can properly map onto them. The number of bytes in the header padding 298 depends on where the header happens to be allocated in memory. If it is only a few bytes from a page boundary, then the header padding is only a few bytes in length. In some cases, the header padding may approach a full page in size (4K in this instance). Trailer "padding" 290 contains the remaining bytes in the block, which is allocated at a fixed size. Again, this fixed size in the preferred embodiment is 4K.

Figure 16:
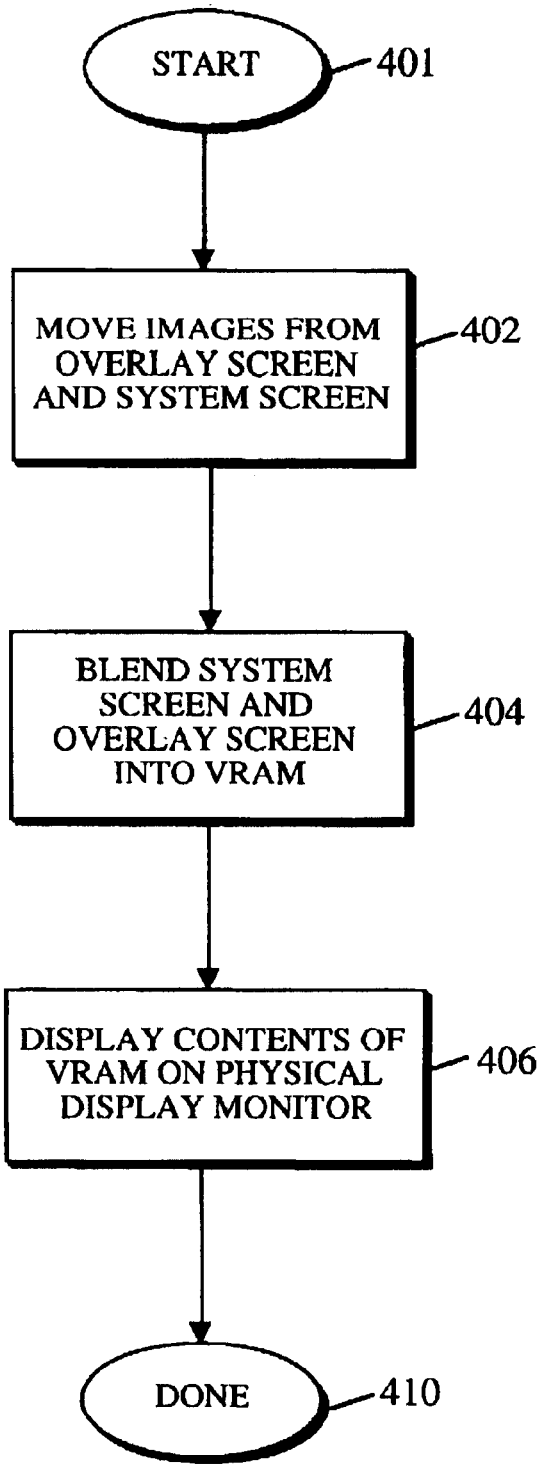
FIG. 16 is a flow diagram illustrating the process of moving an image from overlay screen to system screen, as well as the use of VRAM memory after blending operation to produce a blended image on the display screen.

FIG. 16 is a flow diagram illustrating the process of moving images from overlay screen 82 and system screen 81 for processing, as well as the use of VRAM memory after blending operation to produce a blended image on the display screen 20. In particular, the process begins with a start step 401. According to step 402, images are moved from overlay or translucent screen 82 and the system screen 81. Next, blending is accomplished between the system screen and the overlay or translucent screen, with the results being stored in VRAM 85, according to step 404. Finally, the contents of the VRAM 85 are displayed on the display monitor 20, as per step 406. The operation is completed at step 410.

Figure 17:
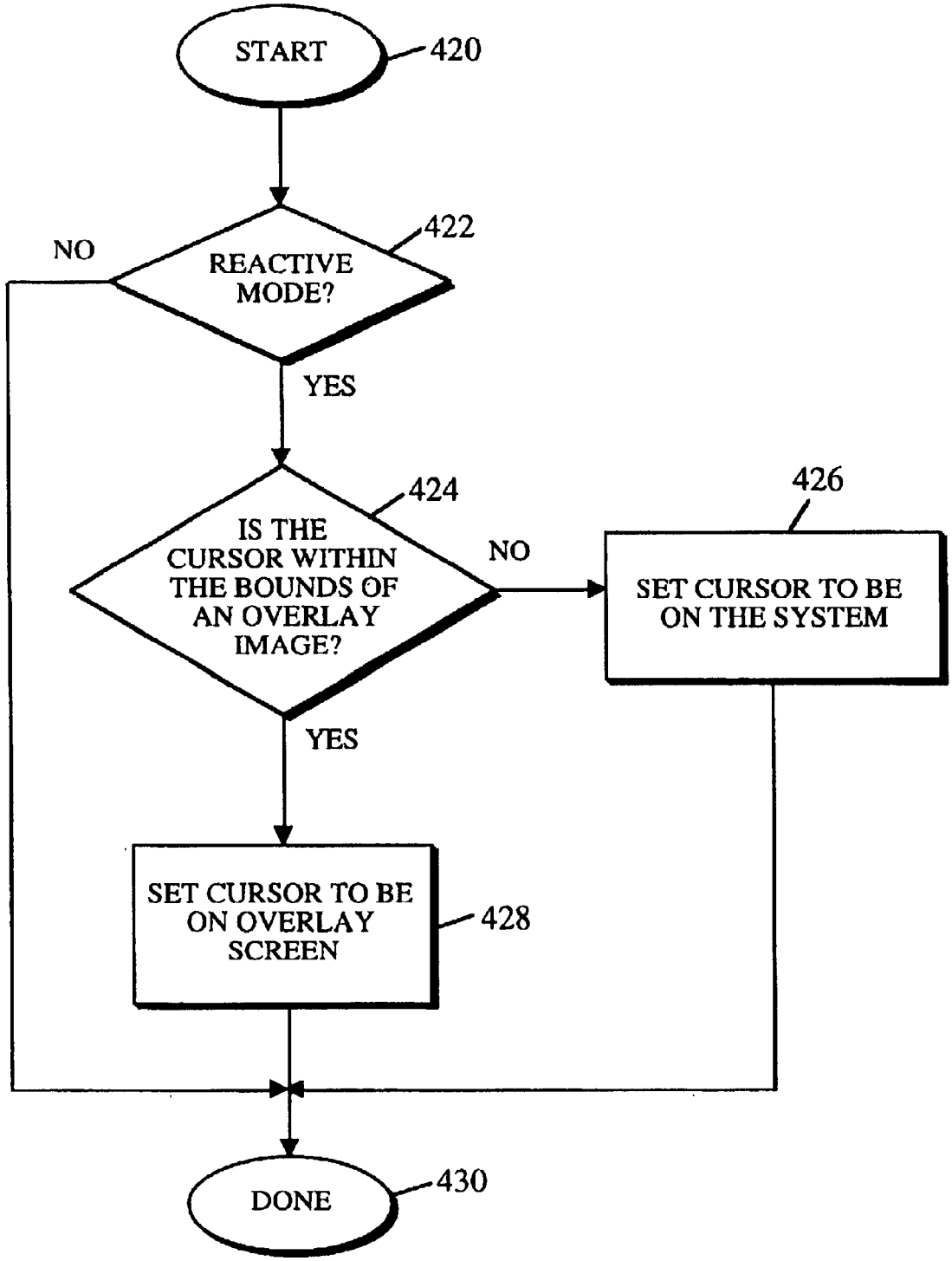
FIG. 17 is a flow diagram showing the process of handling cursor setting between system and overlay modes of operation.

FIG. 17 is a flow diagram showing the process of handling cursor setting between system and overlay modes of operation. The process starts with step 420. Next, a determination is made as to whether to enter the reactive mode, according to step 422. If not, the operation is considered completed, according to step 430. If the reactive mode is in fact indicated, as per step 422, a determination is made as to whether the cursor 39 is within the bounds of an overlay or translucent image, as indicated with process step 424. If the cursor is within the bounds of an overlay image or a translucent image, the cursor 39 is set to be on the overlay or translucent image. If the cursor is not within the bounds of a translucent image, the cursor 39 is set to be on the system monitor, according to process step 426. Once the correct situs of the cursor 39 has been established, the process is considered to be complete.

*In FIG. 18, a screen 1040 of a Macintosh computer system made by Apple Computer, Inc., of Cupertino. Calif., includes a desktop image 1042 produced by a Macintosh operating system, a window 1044 produced by a "AppleShare" application program made by Apple Computer, Inc., and a palette 1046 produced by a small application program or "utility" known as "PenBoard" made by Apple Computer, Inc. The desktop 1042, which includes a menu bar 1048 and a desk area 1050, often displays a number of icons 1052, 1054 and 1056, which represent different objects or functions. For example, the icon 1052 represents a hard disk drive; icon 1054 represents the "trash can" in which files can be deleted; and icon 1056 represents a folder which can contain applications and documents of various types. The menu bar 1048 preferably includes a number of labels 1058, 1060, and 1062 for pull-down menus, as is well known to Macintosh users.*

*As mentioned previously, the desktop 1042 is created by the operating system (sometimes referred to as the "Finder"). The Finder can be considered to be a specialized form of application program which displays an image on the entirety of the screen 1040. In other words, the "window" size of the desktop 1042 is the same size as the screen 1040. The application program AppleShare which creates the window 1044 typically does not take over the entire screen 1040. Similarly, the palette 1046 (which is just a specialized form of window) is produced by the PenBoard application, and does not occupy the entire space of the screen 1040.*

*As is apparent by studying FIG. 18, the screen 1040 can quickly become occupied with icons, windows and palettes. This is not a major problem in traditional computer systems wherein the primary forms of input comprise keyboards and pointer devices, such a mice. However, in the pen computer systems where these more traditional forms of input devices are not always available, the limitations of screen size becomes readily apparent.*

*In FIG. 19, a keyboard image 1064 has been provided on screen 1040 to aid in the input of data to the AppleShare application program described previously. Preferably, this keyboard image 1064 is provided by dragging a keyboard icon 1066 off of the PenBoard palette 1046 in a fashion more fully described in copending U.S. patent application Ser. No. 08/060,458, filed May 10, 1993, on behalf of Gough et al., entitled "Method and Apparatus for Interfacing With a Computer System", and assigned to the assignee of the present application, the disclosure of which is hereby incorporated herein by reference in its entirety. As can be seen in this FIG. 19, the keyboard image 1064 completely obscures the icons 1052, 1054 and 1056 of FIG. 18, and almost totally obscures the window 1044 of the AppleShare application program. Information can be entered into the window 1044 of the application program from the keyboard image 1064 by "tapping" on a "key" with the stylus 38. For example, arrow 1068 on the keyboard image 1064 represents the "tapping" on the key "R" with the stylus 38. This tapping action will send a "R" to be displayed in the window 1044 of the AppleShare application just as if a "R" had been typed on a physical keyboard. Again, the functioning of the keyboard image 1064 is discussed in the aforementioned copending U.S. patent application of Gough et al.*

*While the keyboard image 1064 can be used to input data into a currently active application program (such as AppleShare), the keyboard image prevents any user feedback of the information being entered into application windows obscured by the keyboard image. Therefore, it is difficult for the user to determine whether data has been properly entered into the application program. This, in turn, slows down the data entry process, and greatly increases the chances for errors.*

*The present invention solves this problem, as illustrated in FIG. 20. A user taps on a "transparency" icon 1069 on the keyboard image 1064 of FIG. 19 with the stylus 38 to cause the keyboard 1064 to become partially transparent or "translucent." By "translucent" it is meant herein that the overlay image can be seen, but it can also be seen through. Tapping on the transparency icon 1069 of the keyboard image 1064' of FIG. 20 would cause the "solid" keyboard image 1064 of FIG. 19 to reappear.*

*As can be seen, the translucent keyboard image 1064' allows the window 1044 and icons 1052, 1054, and 1056, to be seen through the translucent keyboard image 1064'. In other words, portions of base images which are overlapped by the keyboard image 1064', can still be seen (with some loss in resolution) through the translucent keyboard image 1064'.*

*The functioning of the keyboard image 1064' will be explained in greater detail with reference to FIGS. 21a–21c. In FIG. 21a, the stylus 38 is used to "tap" on the "r" key as indicated by the arrow 1068 and the shading of the "r" key. The keyboard image 1064' "intercepts" the tap 1068 which would otherwise fall on the window 1044, and, instead causes a "r" to be sent to the AppleShare program and be displayed in a password field of the window 1044. (Actually, AppleShare would display a "bullet" instead of the "r" to maintain the security of the password, but it will be assumed in this example that the typed password will remain visible). The "r" within the password field of window 1044 can be seen through the translucent window 1064' in this figure. In FIG. 21b, second tap 1068 on the "i" key will cause the keyboard image 1064' to "intercept" the tap which would*

*otherwise fall on the window 1044, and to send a "i" character to the AppleShare application program which then displays an "i" after the "r" in the password field of window 1044. Next, as seen in FIG. 21c, the "p" key is tapped at 1068, causing the keyboard 1064' to intercept the tap which would otherwise fall on the window 1044 and to send the "p" character to the AppleShare program which displays the character in the password field after the character "r" and "i." Other characters and control characters (such as the "return" button 1070) can be sent to the application program controlling window 1044 in a similar fashion.*

*It will be apparent with a study of FIGS. 20 and 21a–21c that the translucent keyboard image 1064' is a distinctly superior user interface for situations in which screen area is at a premium. Since images "beneath" the translucent keyboard image 1064' can be seen through the keyboard image, the user has immediate feedback as to the accuracy of his or her input to the active application program. For example, if a key were "tapped" in error, the backspace key 1072 can be tapped on the translucent keyboard 1064' so that the correct character can be reentered. The translucent keyboard 1064' therefore effectively expands the useful area of screen 1040 by providing multiple, usable, overlapped images.*

*A preferred method in accordance with the present invention for implementing the process 133 on a Macintosh computer system is illustrated with reference to FIG. 22. The illustrated method of FIG. 22 is fairly specific to the Macintosh computer system. It will therefore be apparent to those skilled in the art that when the process 133 is implemented on other computer systems, such as MS-DOS compatible computer systems and UNIX computer systems, that the methodology of FIG. 22 will have to be modified. However, such modifications will become readily apparent to those skilled in the art after studying the following descriptions of how the process 133 is implemented on the Macintosh computer system.*

*In FIG. 22, the operating system, application program, overlay utility, system routines, etc., are shown in a somewhat hierarchical fashion. At the highest level is the operating system 1096 of the computer system 10 of FIG. 1. Running under the operating system 1096 is an application program 1098, such as the aforementioned AppleShare application program. Application program 1098, when it wants to open a window such as window 1044 of FIG. 18, calls a set of routines 1100 provided by the operating system 1096. More specifically, in the Macintosh operating system, application program 1098 calls a "New Window" routine 1102 which, in turn, calls a "Frame Rect" routine 1104. The Frame Rect routine uses a pointer table 1106 to call a "Shield Cursor" routine 1107 and a "Show Cursor" routine 1108. If the application program 1098 were running on system 1096 without the process 133 of the present invention, this would be the entirety of the calls to open up the window 1044 of FIG. 18. This process is extensively documented in the multi-volume reference set, Inside Macintosh, by C. Rose et al., Addison-Wesley Publishing Company, Inc., July 1988 and are well known to those skilled in the art of programming on the Macintosh operating system.*

*The implementation of computer implemented process 133 modifies this normal flow of routine calls in the following way. When the application program 1098 calls the New Window routine 1102 which calls the Frame Rect routine 1104, which attempts to call the Shield Cursor Routine, the Frame Rect routine 1104 instead calls a portion of the process of step 138 of FIG. 6B known as the Overlay Shield Cursor Patch 1110. This is accomplished by having the process 138 modify the pointer table 1106 such that when the Frame Rect routine 1104 is trying to call the Shield Cursor Routine 1107 it, instead, calls the Overlay Shield Cursor Patch 1110. After the Overlay Shield Cursor Patch 1110 completes its process, the Shield Cursor Routine 1107 is then called. As far as the Frame Rect routine 1104 is concerned, it does not know of the diversion of process control to the Overlay Shield Cursor Patch process 1110, and instead believes that it directly called the Shield Cursor Routine 1107.*

*The process step 138 of FIG. 6B similarly "tricks" the Frame Rect routine 1104 when it attempts to call the Show Cursor Routine 1108. In that instance, when the Frame Rect routine 1104 goes to the pointer table 1106 in an attempt to call the Show Cursor Routine 1108, process control is instead diverted to a process 1112 known as "Overlay Show Cursor Patch". The Overlay Show Cursor Patch process 1112 interacts with a Blending Engine process 1114 to blend a first screen image 1116 generated by the Macintosh operating system and the application program, with a second image 1118 (in this case, the keyboard image) to form the blended image 1120. The operation of the Blending Engine will be discussed in greater detail subsequently. After the completion of the blending process of 1114, the Overlay Show Cursor Patch process 1112 turns over process control to the "Show Cursor Routine" process 1108. Again, as far as the Frame Rect routine 1104 is concerned, it made a direct call to the "Show Cursor Routine" 1108 and was ignorant of the diversion of the process control to the Overlay Show Cursor Patch 1112 and the Blending Engine 1114.*

*FIG. 23 illustrates an alternate embodiment of the present invention which has been optimized for screen-writing speed. While the process of FIG. 22 works very well, it requires that the entirety of the base screen 1116 be rewritten whenever the blended image 1120 is to be refreshed. The alternative process of FIG. 23 only refreshes the portions of the blended image that needs to be refreshed, thereby greatly increasing the writing speed to the screen 1040.*

*Much of the operation of the process illustrated in FIG. 23 is similar to that described in FIG. 22. An operating system 1172 supports an application program 1174 which, when it wants to open a window, calls a set of routines 1176 including a "New Window routine" 1178 and Frame Rect routine 1180. The Frame Rect routine 1180 then, as before, attempts to first call the Shield Cursor Routine 1182 first and then the Show Cursor Routine 1184. Again, as before, the pointer table is modified such that when the Frame Rect routine tries to call the Shield Cursor Routine 1182, it instead calls the Overlay Shield Cursor Patch 1186 of the present invention, and when the Frame Rect routine 1180 attempts to call the Show Cursor Routine 1184 it instead calls the Overlay Show Cursor Patch 1188. The Overlay Show Cursor Patch calls a Blending Engine 1190 which blends a partial base image 1192 with an overlay image 1194 to create a blended image 1196.*

*The system 1172, as part of its functioning, will make periodic calls to various system task processes 1198. The system task 1198 performs such functions as execute "Device Driver Code" and "Desk Accessory Code." The process of the present invention opportunistically takes advantage of these periodic system task calls by modifying a pointer table 1200 to turn over process control to an Overlay System Task Patch 1202. This Overlay System Task Patch, along with the Overlay Shield Cursor Patch 1186, the Overlay Show Cursor Patch 1188, and the Blending Engine 1190 comprise the overlay utility 133 of FIGS. 6A and 6B in this second preferred embodiment.*

*FIG. 24 is used to illustrate the operation of the Blending Engine 1190 of FIG. 23 in greater detail. The process 138 of*

*FIG. 6B remaps certain pages of VRAM to the RAM screen buffer when an overlay image contains objects that overlap these pages. The RAM overlay screen buffer 1194 is then merged with the RAM screen buffer 1192 in the Blending Engine 1190 by a process similar to that previously described and inserts the blended image into a "hole" 1204 of the VRAM screen buffer 1196. The portions 1206 and 1208 of the VRAM screen buffer remain the VRAM since the overlay image of the present invention does not overlap pages comprising these portions of the screen.*

*Since portions 1206 and 1208 are pages of VRAM screen buffer memory which are not overlapped, at least in part, by an overlay image of the present invention, these portions 1206 and 1208 can remain in VRAM screen buffer. VRAM screen buffer is much faster memory for video purposes than the RAM screen buffer 1192. Also, changes made to the RAM screen buffer 1192 or to the RAM overlay screen buffer 1194 that do not cause a change in portions 1206 and 1208 do not require that the system blend the portions 1206 and 1208. The combination of these factors substantially increase the blending speed of the VRAM screen buffer and therefore of the display on screen 1040.*

Figure 25:
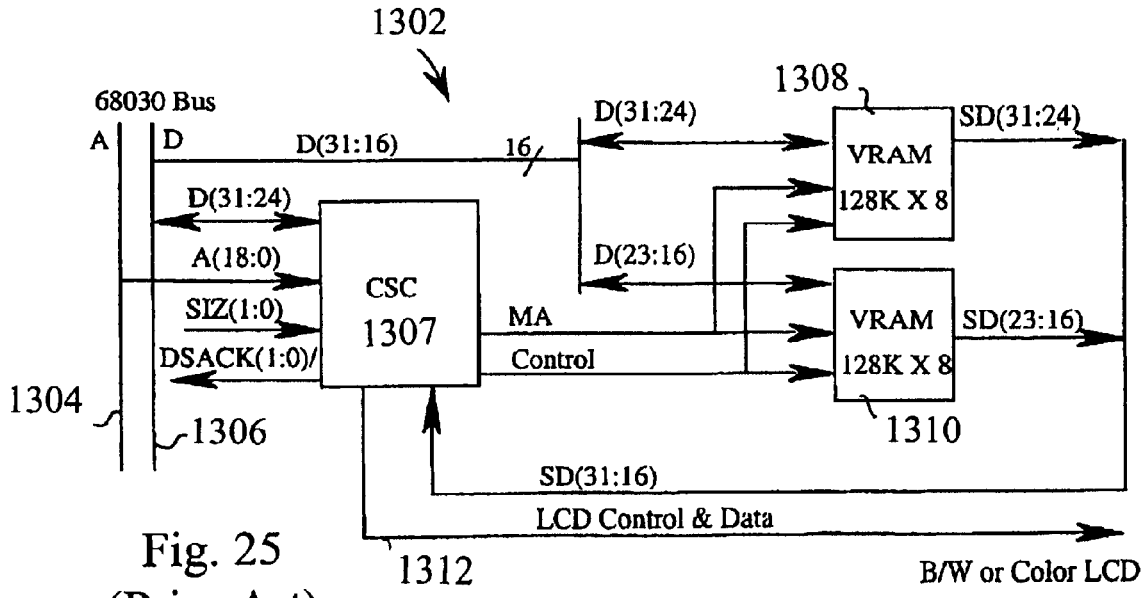
Fig. 25 (Prior Art)
*FIG. 25 illustrates a video driver circuitry of a prior art Macintosh computer system produced by Apple Computer, Inc. of Cupertino, Calif.; and*

*FIGS. 25 and 26 are used to illustrate an alternate embodiment of the present invention wherein the blending of the base image and the overlay image are performed in the video driver hardware rather than within a computer implemented process on the CPU. In FIG. 25, a prior art video driver system of a Macintosh computer system is illustrated. In this prior art example, the video driver circuit 1302 is coupled to an address bus 1304 and a data bus 1306 connected to a Motorola 68030 microprocessor. The video driver circuit 1302 includes a color screen controller CSC 1307, and two banks of VRAM 1308 and 1310. The CSC 1307 produces LCD control and data on a bus 1312 which control a black and white or color liquid crystal display (LCD). For example, the video driver circuit 1302 can drive an Esher LCD circuit for a 640 by 400 bit display, with eight bits of information per pixel.*

*In FIG. 26, a modified video driver circuit 1302' is coupled to the same Motorola 68030 address bus 1304 and data bus 1306, and includes the same CSC 1307, VRAM 1308, and VRAM 1310. However, the data and address connections have been modified as indicated. In this implementation, data from the screen buffer and the overlay screen buffer are input into the VRAM of modified video driver circuit 1302', and combined therein to provide LCD control and blended data on the bus 1312. Again, the video driver circuit 1302' can control a black and white or color LCD, except this time instead of having eight bits per pixel, there are four bits allocated to the base image and four bits allocated to the overlay image. A color look-up table (CLUT)—not shown—of CSC 1307 is loaded with 256 entries which detail each possible combination of bits from the 4 bit screen and the 4 bit overlay, and what the resultant blended value is. The color capability of the CSC 1307 is therefore no longer used for color look-up, and is instead used for the blending values. This technique makes it possible to use off-the-shelf integrated circuits, such as the CSC 1307 which is available from Chips & Technologies, Inc. of San Jose, Calif., to perform an entirely new operation.*

In summary, the method of the invention includes establishing translucent images on a display screen including displaying a translucent images and conducting image operations enabled by the translucent image. Image operations can be any kind of operation conducted on an image or window. Drawing an image, placing an image, or for that matter modifying, moving, expanding, or changing an image or a window, are considered to be image operations. A reference image could be provided by a selected first application program. The translucent image could be produced by a selected second application program. The user is thus enabled to make sketches on the translucent image or window based upon what he or she sees on the base image produced by the first application program. This is made possible without any direct intervention in the operations of the first application program. In short, the features of the first application program are advantageously employed, without any modification of the first application program itself. The technical enablement of this cooperative screen is found in a feature of the invention according to which the second application program intercepts certain screen inputs of the first application program and uses them to supply the screen input needed as to the second application program.

The image operations enabled by the concurrent interoperability of the two applications can be implemented by user selected intervention at any of a number of screen operational levels. The base image or window is considered to operate at a lower level, or below the level of the translucent image or window. Thus, the translucent image or window is known as the "overlay" image or window. Typically, the cursor is active at the particular level at which the user can operate. In any case, according to the invention, it may be useful to operate at either the base level, i.e., the level of the base image or window, or at the translucent overlay level. In other words, user input is permitted at either the base image or the translucent image. By a particular user input with respect to an image, the user implements a selected computer implemented process and the process receives screen inputs which contact or are otherwise associated with a particular window as the computer implemented process is effective for processing the screen inputs. These various inputs are controllable selectively by the user, in that users can take specific actions to determine which of the levels will be active for them. This can, for example, be accomplished by action of clicking or activating a pen or stylus or by another well known action users are considered capable of actuating. A particular window just opened is automatically active, as the newest window created or activated. Another window or image can be activated merely by user selection in positioning the cursor over the window or image and clicking on the mouse, trackball or another applicable interface device.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

[1. A method for establishing a translucent window having a translucent window background and a translucent window frame on a display screen of a computer system, comprising the steps of:

displaying a translucent window on a display screen such that a base window can be seen through said translucent window, and conducting image operations on at least one of said translucent window and said base window.]

[2. A method as recited in claim 1 wherein said base window is produced on said display screen by a first computer implemented process running on said computer system, and said translucent window is produced by a second computer implemented process running on said computer system.]

[3. A method as recited in claim 2 wherein said second computer implemented process receives screen inputs which are associated with said translucent window and processes said screen inputs.]

[4. A method as recited in claim 2, wherein said second computer implemented process receives screen inputs which are physically applied in connection with said translucent window and processes said screen inputs.]

[5. A method as recited in claim 2, wherein said second computer implemented process receives screen inputs which make image contact with said translucent window and processes said screen inputs.]

[6. A method as recited in claim 1 wherein image operations are conducted with respect to said translucent window.]

[7. A method as recited in claim 1 wherein image operations are conducted below said translucent window.]

[8. A method as recited in claim 1 wherein image operations are conducted in connection with windows referenced by a cursor indication.]

[9. A method for displaying images on a display screen of a computer system, comprising the steps of:

displaying a base image on a display screen of a computer system; and displaying a translucent image on said screen such that portions of said base image which are covered by said translucent image are at least partially visible through said translucent image.]

[10. A method as recited in claim 9 wherein said base image and said translucent image are produced by independent computer implemented processes.]

[11. A method as recited in claim 9 wherein said base image is active to receive user inputs.]

[12. A method as recited in claim 9 wherein said translucent image is active to receive user inputs.]

[13. A method as recited in claim 12 wherein said translucent image is made active by user action.]

[14. A method as recited in claim 12 wherein said translucent image is made active by positioning the cursor at a portion of the translucent image and conducting a select action.]

[15. A method as recited in claim 12 wherein said translucent image is made active by clicking a mouse when the cursor is over a portion of the translucent image.]

[16. A method as recited in claim 9 wherein said translucent image and said base image are selectably active to receive user inputs.]

[17. A method for displaying images on a display screen of a computer system comprising the steps of:

running an application program on the central processing unit (CPU) of a computer system to produce a base image on a display screen coupled to said CPU; and running an overlay program on said CPU to produce a translucent image on said display screen such that portions of said base image are overlapped by said translucent image and are at least partially visible through said translucent image.]

[18. A method as recited in claim 17 wherein said step of running an overlay program comprises the steps of:

displaying a translucent image on said display screen;

intercepting screen inputs which contact the translucent image;

processing said intercepted screen inputs in said CPU; and updating said application program based upon said process screen inputs.]

[19. A method as recited in claim 18 wherein said step of displaying a translucent image comprises the step of blending a translucent image with said base image.]

[20. A method as recited in claim 19 wherein said step of blending is accomplished in said CPU.]

[21. A method as recited in claim 19 wherein said step of blending is accomplished externally to said CPU.]

[22. A method as recited in claim 18 wherein said step of processing said intercepted screen inputs includes redirecting at least one page of memory within the memory management means of said computer system.]

[23. A method of performing image operations in a computer system having a display screen, including the steps of:

presenting a first selected image with respect to which image operations are desired, and producing a translucent image effective for overlapping at least a portion of said first selected image.]

[24. A method according to claim 23 wherein said first selected image contains features of interest, and image operations are conducted on said translucent image with respect to said features of interest.]

[25. A method according to claim 23 wherein said translucent image contains features of interest, and image operations are conducted with respect to said first selected image based upon said features of interest.]

[26. A computer system comprising:

a central processing unit (CPU);

screen means for displaying images, said screen means being coupled to said CPU;

display means coupled to said screen means for displaying a translucent image on said screen means; and means for conducting image operations on a region including the level of a translucent image produced by said display means and the level beneath the translucent image.]

[27. A computer system according to claim 26 wherein said means for conducting image operations performs image operations with reference to a translucent image on said screen means.]

[28. A computer system according to claim 26 wherein said means for conducting image operations performs image operations selectably with reference to a translucent image on said screen means and below the level of a translucent image on said screen means.]

*29. A method for displaying images on a display screen of an electronic device, comprising the steps of:*

*displaying a base image on a display screen of the electronic device; and*

*displaying a translucent image on said screen such that portions of said base image which are covered by said translucent image are at least partially visible through said translucent image, wherein said translucent image and said base image are selectably active to receive user input and the base image remains at least partially covered by said translucent image even when selected.*

*30. A method as recited in claim 29, wherein the electronic device is a handheld device.*

*31. A method of performing image operations in an electronic device, including the steps of:*

*presenting a first selected image with respect to which image operations are desired,*

*producing a translucent image effective for overlapping at least a portion of said first selected image, wherein said translucent image contains at least one feature of interest, and*

*conducting an image operation on said first selected image using said feature of interest while the translucent image overlaps at least a portion of the first selected image.*

*32. A method as recited in claim 31, wherein the electronic device is a handheld device.*

*33. A method for displaying images on a display screen of an electronic device, comprising the steps of:*

*displaying a base image on a display screen of said electronic device;*

*displaying a translucent image on said screen such that portions of said base image which are covered by said translucent image are at least partially visible through said translucent image; and*

*receiving input in said displayed base image while said base image remains at least partially covered by said translucent image.*

*34. A method as recited in claim 33, wherein said base image is active to receive user inputs.*

*35. A method as recited in claim 33, wherein the electronic device is a handheld device.*

* * * * *

US00RE41922C1

(12) EX PARTE REEXAMINATION CERTIFICATE (10034th)

United States Patent

Gough et al.

(10) Number: US RE41,922 C1

(45) Certificate Issued: Feb. 12, 2014

(54) METHOD AND APPARATUS FOR PROVIDING TRANSLUCENT IMAGES ON A COMPUTER DISPLAY

(75) Inventors: Michael L. Gough, Ben Lomond, CA (US); Joseph J. MacDougald, Saint Petersburg, FL (US); Gina D. Venolia, Bellevue, WA (US); Thomas S. Gilley, New York, NY (US); Greg M. Robbins, Issaquah, WA (US); Daniel J. Hansen, Jr., Georgetown, TX (US); Abhay Oswal, Rancho Santa Fe, CA (US)

(73) Assignee: Apple Inc., Cupertino, CA (US)

Reexamination Request:
No. 90/012,744, Dec. 18, 2012

Reexamination Certificate for:

| | |
|---|---|
| Patent No.: | **Re. 41,922** |
| Issued: | **Nov. 9, 2010** |
| Appl. No.: | **10/163,748** |
| Filed: | **Jun. 5, 2002** |

Related U.S. Patent Documents

Reissue of:

| | |
|---|---|
| (64) Patent No.: | **6,072,489** |
| Issued: | **Jun. 6, 2000** |
| Appl. No.: | **08/130,079** |
| Filed: | **Sep. 30, 1993** |

Related U.S. Application Data

(63) Continuation-in-part of application No. 08/060,572, filed on May 10, 1993, now Pat. No. 5,638,501.

(51) Int. Cl.
*G06T 15/00* (2011.01)

(52) U.S. Cl.
USPC ..... 715/803; 715/762; 715/781; 345/629

(58) Field of Classification Search
None
See application file for complete search history.

(56) References Cited

To view the complete listing of prior art documents cited during the proceeding for Reexamination Control Number 90/012,744, please refer to the USPTO's public Patent Application Information Retrieval (PAIR) system under the Display References tab.

*Primary Examiner* — Mary Steelman

(57) ABSTRACT

A method and apparatus is described for producing a translucent image over a base image created on the display screen of a computer system by a selected first application program, and conducting image operations either on the base image created by the selected application program with reference to the translucent image produced, or conducting image operations on the translucent image with reference to the base image of the first application program. The first application program runs on a central processing unit (CPU) of a computer system to produce a base image, and another application program referred to as the overlay program is run to produce the translucent image such that portions of the base image which are overlapped by the overlay image are at least partially visible through the translucent image. There is also a mechanism for blending the first video data and the second video data to produce a blended image on the screen assembly.

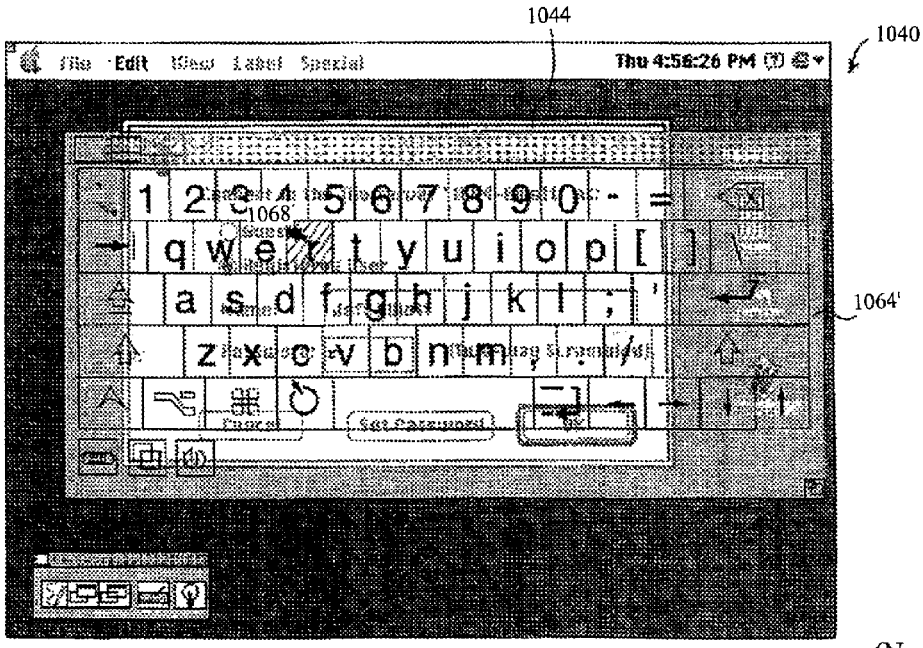

(New)

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 29 and 30 is confirmed.

Claims 1-28 were previously cancelled.

Claim 33 is determined to be patentable as amended.

Claims 34 and 35, dependent on an amended claim, are determined to be patentable.

New claims 36 and 37 are added and determined to be patentable.

Claims 31 and 32 were not reexamined.

33. A method for displaying images on a display screen of an electronic device, comprising the steps of:

displaying a base image on a display screen of said electronic device;

displaying a translucent image on said screen such that portions of said base image which are covered by said translucent image are at least partially visible through said translucent image, wherein said translucent image and said base image are selectably active to receive user input and the base image remains at least partially covered by said translucent image even when selected; and receiving input in said displayed base image while said base image remains at least partially covered by said translucent image.

36. The method of claim 33, wherein the input is a user input.

37. The method of claim 33, further comprising activating the base image to be able to receive input.

* * * * *